United States Patent
Wu et al.

(10) Patent No.: US 11,635,751 B2
(45) Date of Patent: Apr. 25, 2023

(54) MODEL PREDICTIVE MAINTENANCE SYSTEM WITH SHORT-TERM SCHEDULING

(71) Applicant: Johnson Controls Technology Company, Auburn Hills, MI (US)

(72) Inventors: Yaqing Wu, Madison, WI (US); Mohammad N. Elbsat, Milwaukee, WI (US); Michael J. Wenzel, Oak Creek, WI (US); Christos T. Maravelias, Middleton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/017,028

(22) Filed: Sep. 10, 2020

(65) Prior Publication Data
US 2021/0072742 A1 Mar. 11, 2021

Related U.S. Application Data

(60) Provisional application No. 62/898,410, filed on Sep. 10, 2019.

(51) Int. Cl.
*G05B 23/02* (2006.01)
*G05B 15/02* (2006.01)

(52) U.S. Cl.
CPC ......... *G05B 23/0283* (2013.01); *G05B 15/02* (2013.01)

(58) Field of Classification Search
CPC .... G05B 23/0283; G05B 15/00; G05B 15/02; G06Q 10/06; G06Q 10/00; G06Q 10/0631; G06Q 10/087; G06Q 50/08
See application file for complete search history.

(56) References Cited

U.S. PATENT DOCUMENTS 10,101,731 B2  10/2018  Asmus et al.
10,700,942 B2  6/2020  Hamilton et al.
(Continued)

FOREIGN PATENT DOCUMENTS

JP  2020-107153  7/2020
JP  2020-109855  7/2020
(Continued)

OTHER PUBLICATIONS

Marwali and Shahidehpour, "Coordination of Short-Term and Long-Term Transmission Maintenance Scheduling in a Deregulated System", IEEE Power Engineering Review, pp. 46-48, Feb. 1998 (Year: 1998).*
(Continued)

*Primary Examiner* — Natalie Huls
*Assistant Examiner* — Cynthia L Davis
(74) *Attorney, Agent, or Firm* — Foley & Lardner LLP

(57) ABSTRACT

A method for performing model predictive maintenance (MPM) of building equipment includes obtaining a first objective function that defines a cost of operating the building equipment and at least one of replacing the building equipment or performing maintenance on the building equipment as a function of operating decisions and at least one of replacement decisions or maintenance decisions for the building equipment for multiple short-term time steps within a short-term horizon. The method also includes performing a first optimization of the first objective function to generate a short-term maintenance and replacement schedule for the building equipment over a duration of the short-term horizon. The method also includes using a result of the first optimization to perform a second optimization of a second objective function to generate a long-term maintenance and replacement schedule for the building equipment over a duration of a long-term horizon.

19 Claims, 23 Drawing Sheets

(56) References Cited

U.S. PATENT DOCUMENTS

| | | |
|---|---|---|
| 10,762,475 B2 | 9/2020 | Song et al. |
| 2013/0041705 A1* | 2/2013 | Hampapur ............ G06Q 10/10 705/7.12 |
| 2013/0339080 A1 | 12/2013 | Beaulieu et al. |
| 2014/0163935 A1 | 6/2014 | Hosking et al. |
| 2015/0316907 A1 | 11/2015 | Elbsat et al. |
| 2017/0366414 A1 | 12/2017 | Hamilton et al. |
| 2019/0129403 A1 | 5/2019 | Turney et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0347622 A1 | 11/2019 | Elbsat et al. |
| 2020/0090289 A1 | 3/2020 | Elbsat et al. |
| 2020/0096985 A1 | 3/2020 | Wenzel et al. |
| 2020/0301408 A1 | 9/2020 | Elbsat et al. |
| 2020/0356087 A1 | 11/2020 | Elbsat et al. |

FOREIGN PATENT DOCUMENTS

| | | |
|---|---|---|
| WO | PCT/US2020/042916 | 7/2020 |
| WO | PCT/US2020/045238 | 8/2020 |

OTHER PUBLICATIONS

Lahiri, Sinha, Chowdhury, Chowdhury, and Crossley, "Importance of Strategic Maintenance Management for Indian Utility Industry", IEEE 2008 (Year: 2008).*

Ahmad et al., "An overview of time-based and condition-based maintenance in industrial application," Comput. & Ind. Eng., 2012, vol. 63, pp. 135-149.

Ambrosio et al., "Piecewise linear approximation of functions of two variables in MILP models," Oper. Res. Lett., 2010, vol. 38, pp. 39-46.

Eleftheriadis, et al., "Impact of building envelope and mechanical component degradation on the whole building performance: A review paper," Energy Procedia, 2017, vol. 132, pp. 321-326.

Griffith et al., "Methodology for Modeling Building Energy Performance across the Commercial Sector," NREL Technical Report NREL/TP-550-41956, Mar. 2008, 161 pages.

International Search Report and Written Opinion for PCT/US2020/050148, dated Oct. 15, 2020, 14 pages.

Sullivan et al., "Operations & Maintenance Best Practices—A Guide to Achieving Operational Efficiency (Release 3.0)," prepared by Pacific Northwest National Laboratory for the Federal Energy Management Program, US DOE, Aug. 2010, PNNL-19634, 321 pages.

US DOE, "2011 Buildings Energy Data Book," prepared by D&R International, Ltd. for the Buildings Technologies Program, Energy Efficiency and Renewable Energy, US DOE, Mar. 2012, 286 pages.

Waddicor et al., "Climate change and building ageing impact on building energy performance and mitigation measures application: A case study in Turin, northern Italy," Build, and Environ., vol. 102, pp. 13-25.

Zhou et al., "Reliability-centered predictive maintenance scheduling fora continuously monitored system subject to degradation," Reliab. Eng. Syst. Saf., 2007, vol. 92, pp. 530-534.

Moeley, R. K., "An Introduction to Predictive Maintenance," Second Edition, Butterworth Heinemann, Chapters 6 and 16, 2002 (56 pages).

International Preliminary Report on Patentability on PCT Appl. Ser. No. PCT/US2020/050148 dated Mar. 24, 2022 (8 pages).

* cited by examiner

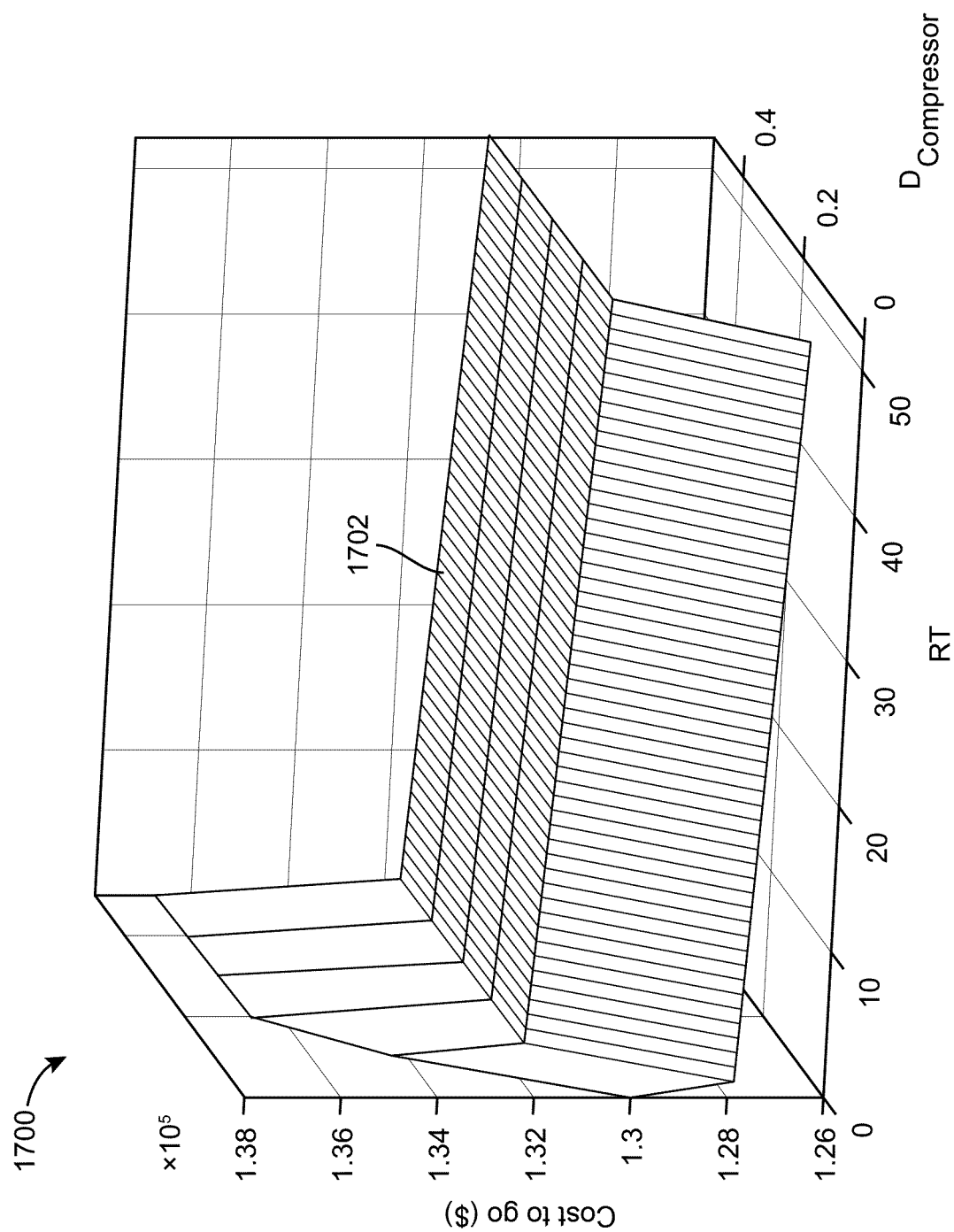

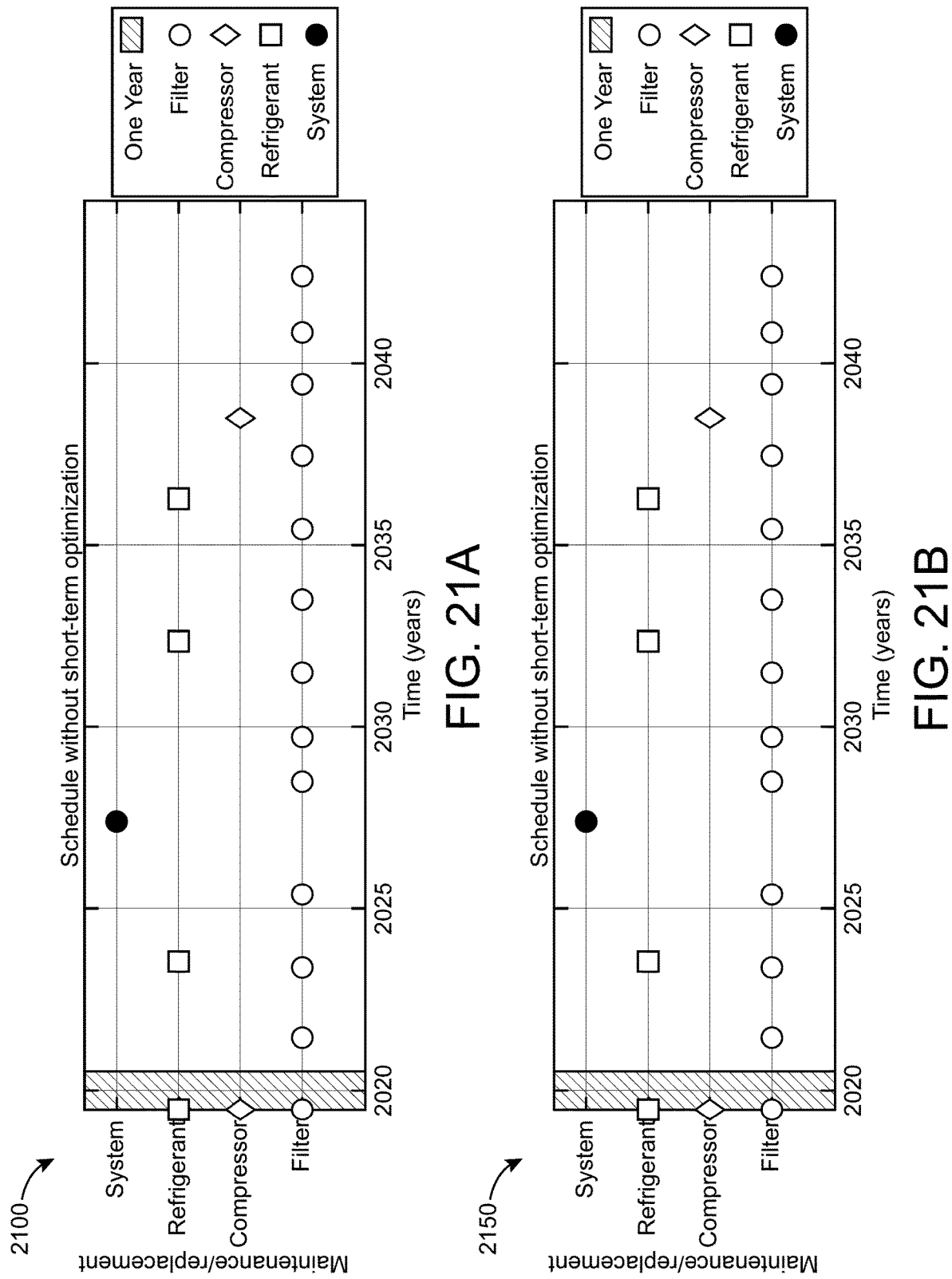

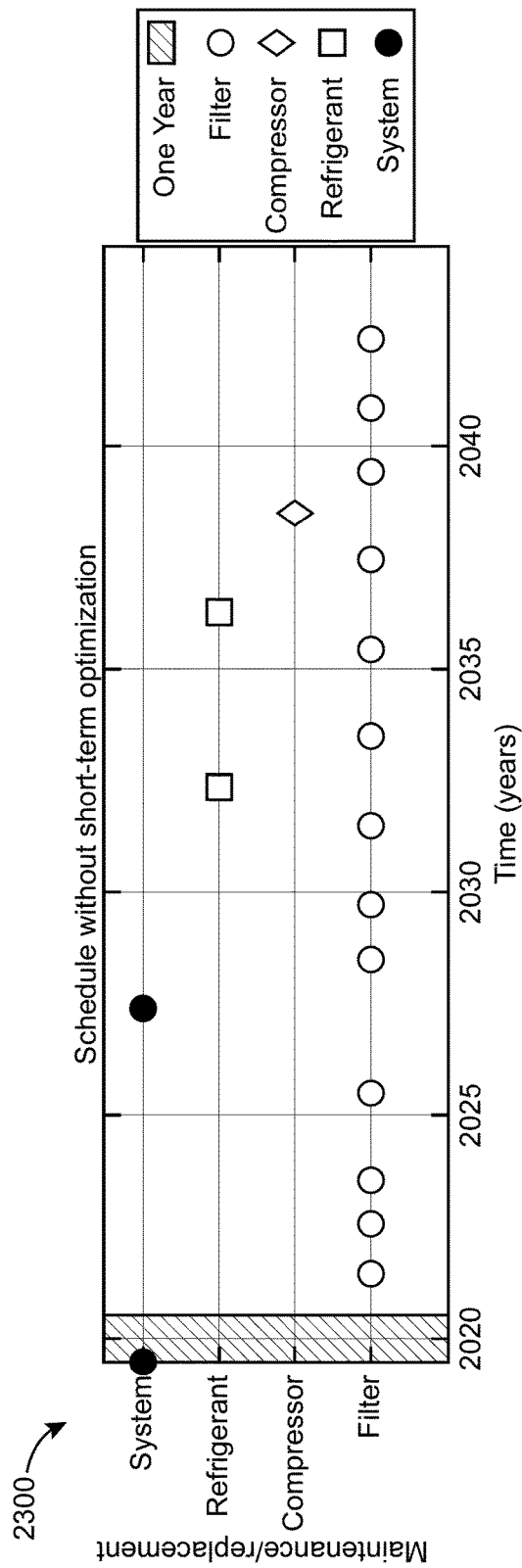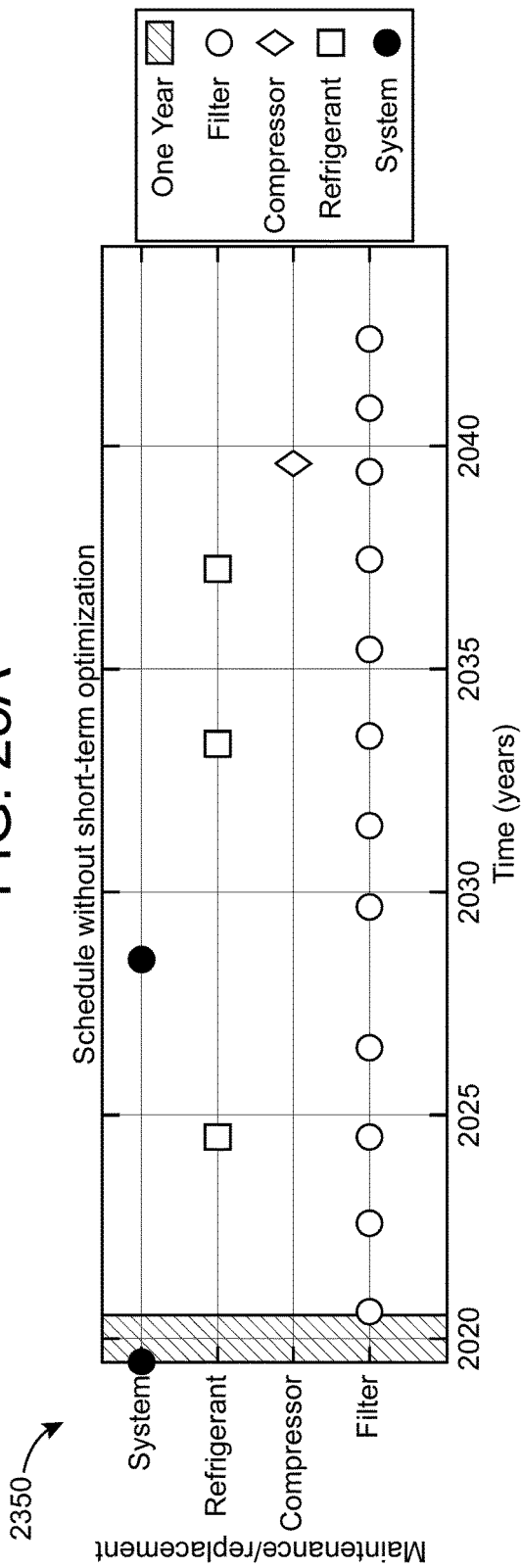

MODEL PREDICTIVE MAINTENANCE SYSTEM WITH SHORT-TERM SCHEDULING

CROSS-REFERENCE TO RELATED PATENT APPLICATION

This application claims the benefit of and priority to U.S. Provisional Patent Application No. 62/898,410, filed Sep. 10, 2019, the entire disclosure of which is incorporated by reference herein.

BACKGROUND

The present disclosure relates generally to a maintenance system for building equipment and more particularly to a maintenance system that determines a maintenance and replacement strategy for the building equipment that is economically viable for a customer.

Building equipment is typically maintained according to a maintenance and replacement strategy for the building equipment. One type of maintenance and replacement strategy is run-to-fail. The run-to-fail strategy allows the building equipment to run until a failure occurs. During this running period, only minor operational maintenance tasks (e.g., oil changes) are performed to maintain the building equipment.

Another type of maintenance and replacement strategy is preventative maintenance. The preventative maintenance and replacement strategy typically involves performing a set of preventative maintenance tasks recommended by the equipment manufactured. The preventative maintenance tasks are usually performed at regular intervals (e.g., every month, every year, etc.) which may be a function of the elapsed time of operation and/or the run hours of the building equipment.

In some cases, maintenance can be recommended to a customer to be performed at certain times and/or for certain building equipment. However, broad recommendations to a customer can result in losses in cost savings over time. It can be difficult to manage accuracy of recommendations with computational efficiency of generating said recommendations.

SUMMARY

One implementation of the present disclosure is a controller for performing model predictive maintenance (MPM) of building equipment, according to some embodiments. The controller includes one or more processors and one or more one or more non-transitory computer-readable media, according to some embodiments. The one or more non-transitory computer-readable media store instructions that, when executed by the one or more processors, cause the one or more processors to perform operations, according to some embodiments. In some embodiments, the operations include obtaining a first objective function that defines a cost of operating the building equipment and at least one of replacing the building equipment or performing maintenance on the building equipment as a function of operating decisions and at least one of replacement decisions or maintenance decisions for the building equipment for multiple short-term time steps within a short-term horizon. In some embodiments, the operations include performing a first optimization of the first objective function to generate a short-term maintenance and replacement schedule for the building equipment over a duration of the short-term horizon. In some embodiments, the operations include using a result of the first optimization to perform a second optimization of a second objective function to generate a long-term maintenance and replacement schedule for the building equipment over a duration of a long-term horizon.

In some embodiments, the operations further include performing a backward calculation of a long-term model to generate a cost penalty defining a total cost over the long-term horizon. In some embodiments, the first optimization is performed based on the cost penalty.

In some embodiments, the operations further include identifying a degradation state at an end of the short-term horizon based on the first optimization. In some embodiments, the second optimization is performed based on the degradation state at the end of the short-term horizon.

In some embodiments, the operations further include concatenating the short-term maintenance and replacement schedule and the long-term maintenance and replacement schedule to generate a final maintenance and replacement schedule that optimizes costs over the short-term horizon and the long-term horizon.

In some embodiments, the operations further include decomposing the first objective function into a replacement objective function that enforces replacement of the building equipment and a non-replacement objective function that forbids replacement of the building equipment. In some embodiments, the operations further include performing separate optimizations for the replacement objective function and the non-replacement objective function to generate separate maintenance and replacement schedules. In some embodiments, the operations include selecting whichever of the separate maintenance and replacement schedules that is associated with a lower total cost as the short-term maintenance schedule.

In some embodiments, the first optimization and the second optimization are based on at least one of system information describing one or more dynamics of a space of a building, pricing information, or a resource demand.

In some embodiments, the first optimization and the second optimization are performed respective of a total degradation of the building equipment. In some embodiments, the total degradation includes a recoverable degradation that can be recovered by performing maintenance on the building equipment or by replacing the building equipment. In some embodiments, the total degradation includes a permanent degradation that can be recovered by replacing the building equipment and cannot be recovered by performing maintenance on the building equipment.

Another implementation of the present disclosure is a method for performing model predictive maintenance (MPM) of building equipment, according to some embodiments. In some embodiments, the method includes obtaining a first objective function that defines a cost of operating the building equipment and at least one of replacing the building equipment or performing maintenance on the building equipment as a function of operating decisions and at least one of replacement decisions or maintenance decisions for the building equipment for multiple short-term time steps within a short-term horizon. In some embodiments, the method includes performing a first optimization of the first objective function to generate a short-term maintenance and replacement schedule for the building equipment over a duration of the short-term horizon. In some embodiments, the method includes using a result of the first optimization to perform a second optimization of a second objective function to generate a long-term maintenance and replacement schedule for the building equipment over a duration of a long-term horizon.

In some embodiments, the method further includes performing a backward calculation of a long-term model to generate a cost penalty defining a total cost over the long-term horizon. In some embodiments, the first optimization is performed based on the cost penalty.

In some embodiments, the method further includes identifying a degradation state at an end of the short-term horizon based on the first optimization. In some embodiments, the second optimization is performed based on the degradation state at the end of the short-term horizon.

In some embodiments, the method further includes concatenating the short-term maintenance and replacement schedule and the long-term maintenance and replacement schedule to generate a final maintenance and replacement schedule that optimizes costs over the short-term horizon and the long-term horizon.

In some embodiments, the method further includes decomposing the first objective function into a replacement objective function that enforces replacement of the building equipment and a non-replacement objective function that forbids replacement of the building equipment. In some embodiments, the method further includes performing separate optimizations for the replacement objective function and the non-replacement objective function to generate separate maintenance and replacement schedules. In some embodiments, the method includes selecting whichever of the separate maintenance and replacement schedules that is associated with a lower total cost as the short-term maintenance schedule.

In some embodiments, the first optimization and the second optimization are based on at least one of system information describing one or more dynamics of a space of a building, pricing information, or a resource demand.

In some embodiments, the first optimization and the second optimization are performed respective of a total degradation of the building equipment. In some embodiments, the total degradation includes a recoverable degradation that can be recovered by performing maintenance on the building equipment or by replacing the building equipment and a permanent degradation that can be recovered by replacing the building equipment and cannot be recovered by performing maintenance on the building equipment.

Another implementation of the present disclosure is a model predictive maintenance (MPM) system for building equipment, according to some embodiments. In some embodiments, the system includes the building equipment that operates to affect a variable state or condition of a building and one or more processing circuits. In some embodiments, the one or more processing circuits include one or more processors and memory storing instructions that, when executed by the one or more processors, cause the one or more processors to perform operations. In some embodiments, the operations include obtaining a first objective function that defines a cost of operating the building equipment and at least one of replacing the building equipment or performing maintenance on the building equipment as a function of operating decisions and at least one of replacement decisions or maintenance decisions for the building equipment for multiple short-term time steps within a short-term horizon. In some embodiments, the operations include performing a first optimization of the first objective function to generate a short-term maintenance and replacement schedule for the building equipment over a duration of the short-term horizon. In some embodiments, the operations include using a result of the first optimization to perform a second optimization of a second objective function to generate a long-term maintenance and replacement schedule for the building equipment over a duration of a long-term horizon.

In some embodiments, the operations further include performing a backward calculation of a long-term model to generate a cost penalty defining a total cost over the long-term horizon. In some embodiments, the first optimization is performed based on the cost penalty.

In some embodiments, the operations further include identifying a degradation state at an end of the short-term horizon based on the first optimization. In some embodiments, the second optimization is performed based on the degradation state at the end of the short-term horizon.

In some embodiments, the operations further include concatenating the short-term maintenance and replacement schedule and the long-term maintenance and replacement schedule to generate a final maintenance and replacement schedule that optimizes costs over the short-term horizon and the long-term horizon.

In some embodiments, the operations further include decomposing the first objective function into a replacement objective function that enforces replacement of the building equipment and a non-replacement objective function that forbids replacement of the building equipment. In some embodiments, the operations include performing separate optimizations for the replacement objective function and the non-replacement objective function to generate separate maintenance and replacement schedules. In some embodiments, the operations include selecting whichever of the separate maintenance and replacement schedules that is associated with a lower total cost as the short-term maintenance schedule.

In some embodiments, the first optimization and the second optimization are performed respective of a total degradation of the building equipment. In some embodiments, the total degradation includes a recoverable degradation that can be recovered by performing maintenance on the building equipment or by replacing the building equipment. In some embodiments, the total degradation includes a permanent degradation that can be recovered by replacing the building equipment and cannot be recovered by performing maintenance on the building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 17 is a graph illustrating a projection of a cost-to-go penalty onto a surface, according to some embodiments.

FIG. 21A is a graph illustrating a maintenance and replacement schedule generated with a short-term optimization being performed for a system high recoverable degradation, according to some embodiments.

FIG. 21B is a graph illustrating a maintenance and replacement schedule generated without a short-term optimization being performed for a system high recoverable degradation, according to some embodiments.

FIG. 23A is a graph illustrating a maintenance and replacement schedule generated with a short-term optimization being performed for a system high total degradation, according to some embodiments.

FIG. 23B is a graph illustrating a maintenance and replacement schedule generated without a short-term optimization being performed for a system high total degradation, according to some embodiments.

DETAILED DESCRIPTION

Overview

Figure 1:
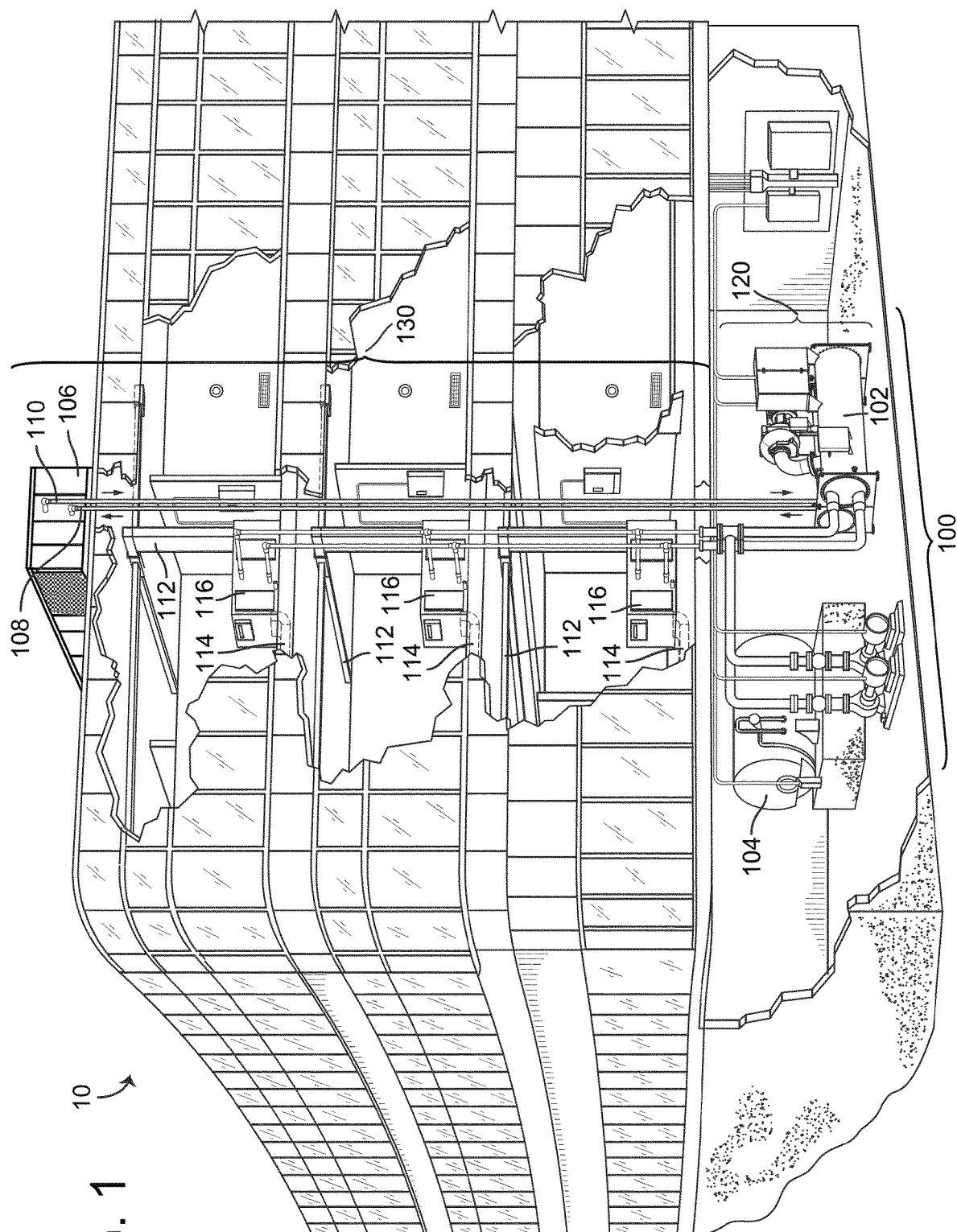
FIG. 1 is a drawing of a building equipped with a HVAC system, according to some embodiments embodiment.

Referring generally to the FIGURES, a model predictive maintenance (MPM) system and components thereof are shown, according to various exemplary embodiments. The MPM system can be configured to determine a maintenance and replacement strategy for building equipment. The maintenance and replacement strategy can indicate optimal times for maintenance and/or replacement of building equipment to occur in order to optimize (e.g., reduce) costs over an optimization period. In some embodiments, the terms maintenance strategy, recommended maintenance and replacement strategy, and the like are used interchangeably with the maintenance and replacement strategy to refer to a strategy indicating maintenance/replacement recommendations for building equipment.

One example of an objective function which can be optimized by the MPM system is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by the building equipment at time step i of the optimization period, $P_{op,i}$ is the power consumption (e.g., kW) of the building equipment at time step i, $\Delta t$ is the duration of each time step i, $C_{main,i}$ is the cost of maintenance performed on the building equipment at time step i, $B_{main,i}$ is a binary variable that indicates whether the maintenance is performed, $C_{cap,i}$ is the capital cost of purchasing a new device of the building equipment at time step i, $B_{cap,i}$ is a binary variable that indicates whether the new device is purchased, and h is the duration of the horizon or optimization period over which the optimization is performed.

The first term in the objective function J can represent the operating cost of the building equipment over the duration of the optimization period. In some embodiments, the cost per unit of energy $C_{op,i}$ is received from a utility as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of the building. The heating or cooling load can be predicted by the MPM system as a function of building occupancy, the time of day, the day of the week, the current season, or other factors that can affect the heating or cooling load. In some embodiments, the MPM system uses weather forecasts from a weather service to predict the heating or cooling load. The power consumption $P_{op,i}$ may also depend on the efficiency $\eta_i$ of the building equipment. For example, building equipment that operate at a high efficiency may consume less power $P_{op,i}$ to satisfy the same heating or cooling load relative to building equipment that operate at a low efficiency.

Advantageously, the MPM system can model the efficiency $\eta_i$ of the building equipment at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by the MPM system to determine the optimal set of maintenance and equipment purchase decisions (i.e., optimal values for the binary decision variables $B_{main,i}$ and $B_{cap,i}$) over the duration of the optimization period.

In some embodiments, the MPM system uses equipment performance information received as a feedback from the building equipment to estimate the efficiency and/or the reliability of the building equipment. The efficiency may indicate a relationship between the heating or cooling load on the building equipment and the power consumption of the building equipment. The MPM system can use the efficiency to calculate the corresponding value of $P_{op,i}$. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment was purchased or installed.

In some embodiments, the MPM system generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the optimization period, whereas a value of $B_{cap,25}=0$ may indicate that the new device should not be purchased at that time step.

In some embodiments, the MPM system as described above incorporates short-term scheduling functionality. Short-term scheduling can refer to MPM optimizations performed for shorter time horizons and time steps within the time horizons to generate more accurate maintenance/replacement recommendations in the near future. For example, a standard MPM optimization may consider a long-term horizon of 24 years with weekly time steps, whereas a short-term optimization may consider a short-term horizon of one year with daily time steps. The short-term optimization and the long-term optimization (i.e., the standard MPM optimization) can provide feedback to one another to improve accuracy of scheduling decisions. In particular, the long-term optimization can be backward calculated to generate and provide a cost-to-go penalty to the short-term optimization. Based on performing the short-term optimization respective of the cost-to-go penalty, degradation states at the end of the short-term horizon can be provided back to the long-term horizon such that a forward calculation can be performed for the long-term horizon. Integrating the short-term and the long-term optimization can ensure that the most optimal decisions are generated and that myopic schedules are avoided.

Advantageously, the short-term optimization can be used to generate more specific maintenance and replacement decisions that can ensure building equipment is maintained/replaced at more optimal points in time. Further, short-term optimizations can provide more accurate predictions of building equipment degradation which can lead to more accurate cost predictions. These and other features of the systems and methods are described in detail below.

Building HVAC Systems and Building Management Systems

Figure 2:
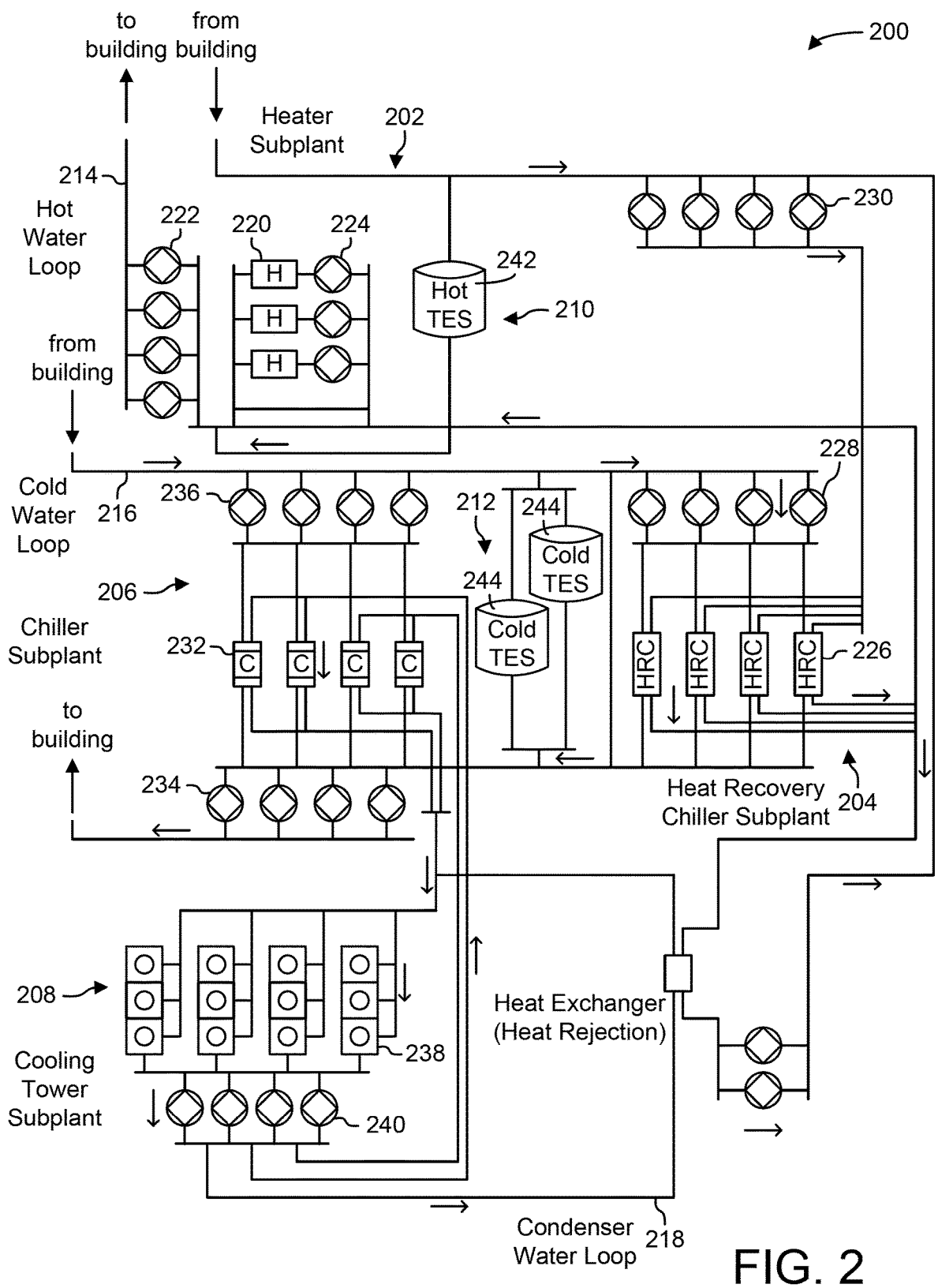
FIG. 2 is a block diagram of a waterside system which can be used to serve the heating or cooling loads of the building of FIG. 1, according to some embodiments.
Figure 3:
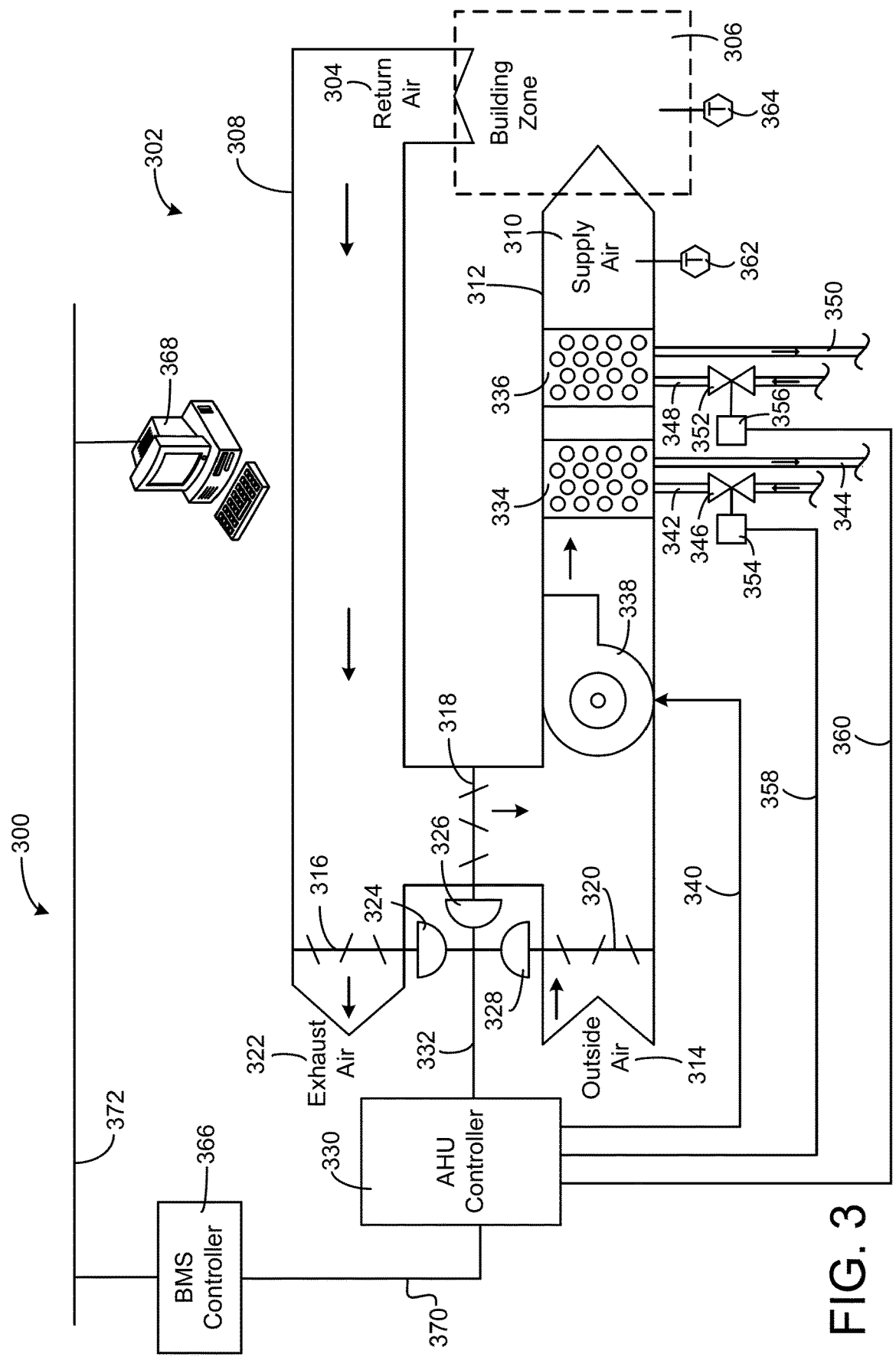
FIG. 3 is a block diagram of an airside system which can be used to serve the heating or cooling loads of the building of FIG. 1, according to some embodiments.
Figure 4:
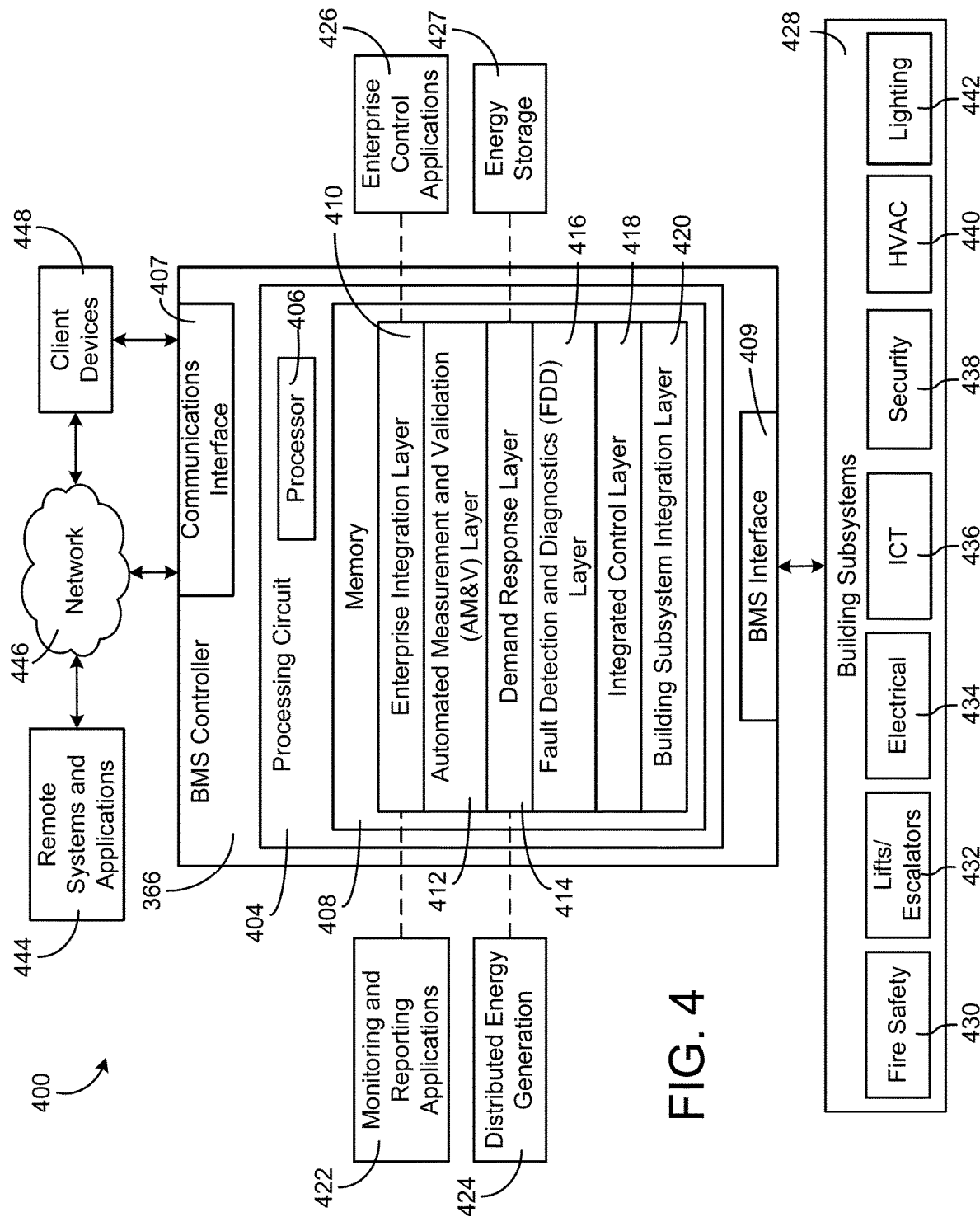
FIG. 4 is a block diagram of a building management system (BMS) which can be used to monitor and control the building of FIG. 1, according to some embodiments.
Figure 5:
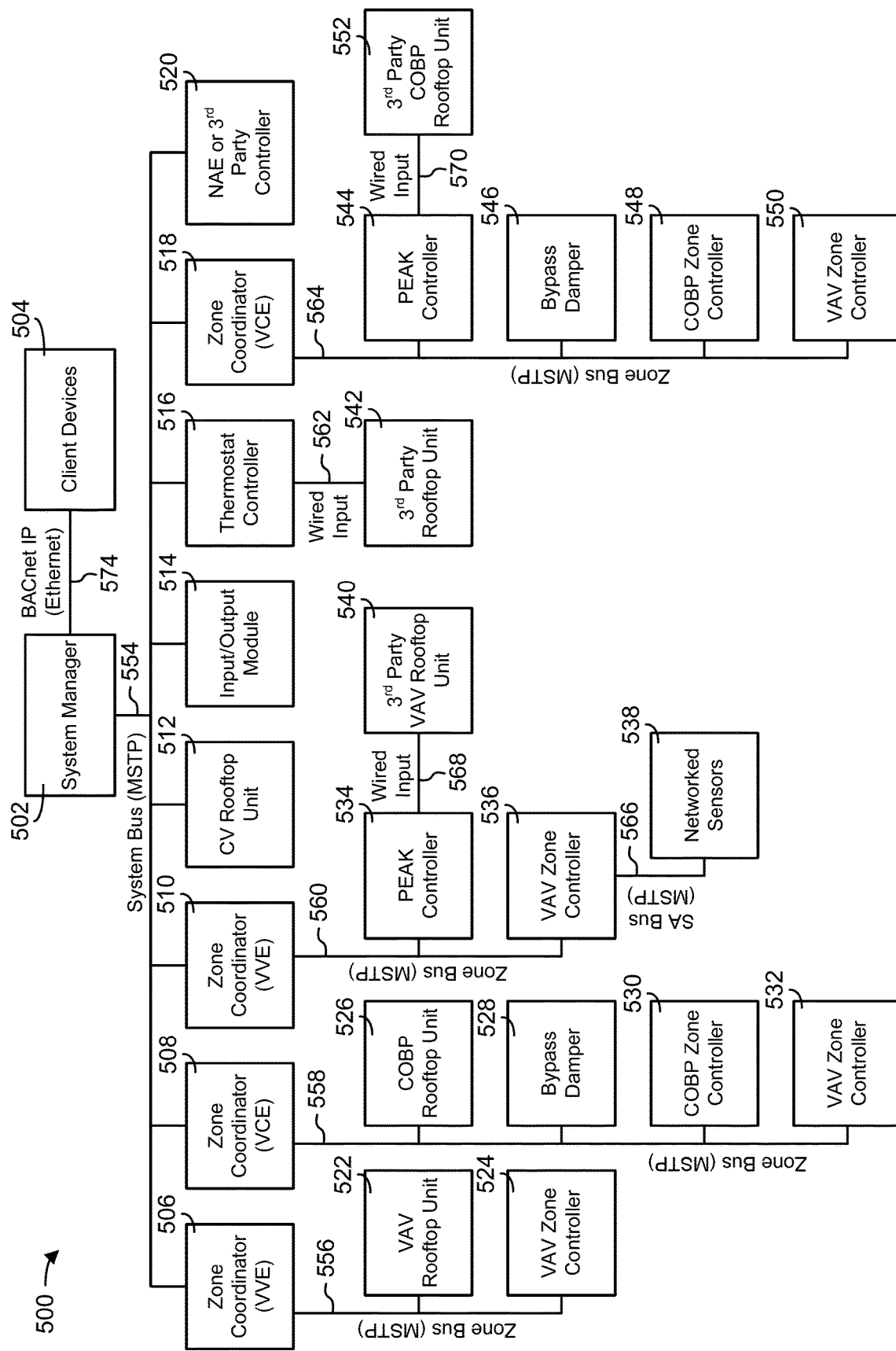
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
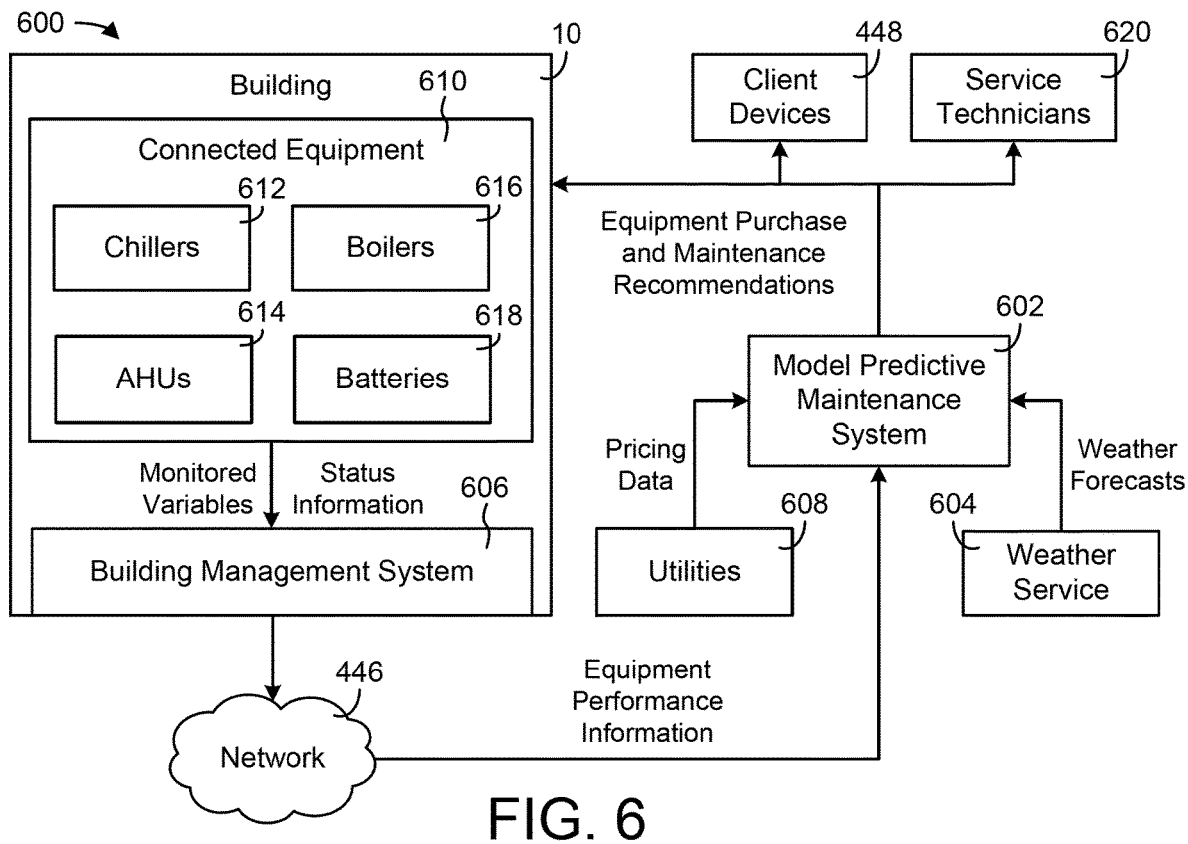
FIG. 6 is a block diagram of a building system including a model predictive maintenance (MPM) system that monitors equipment performance information from connected equipment installed in the building, according to some embodiments.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
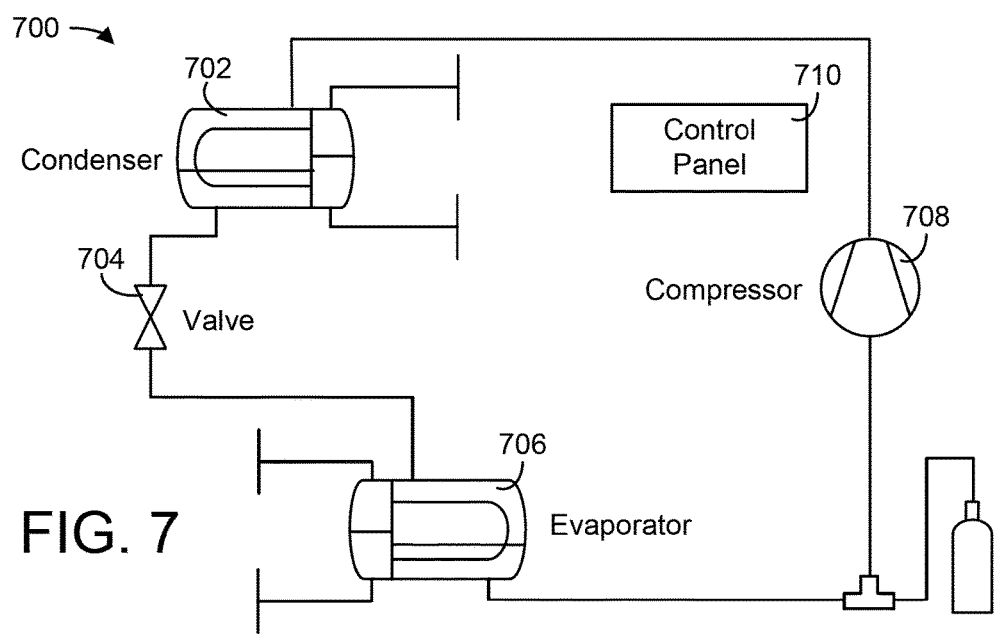
FIG. 7 is a schematic diagram of a chiller which may be a type of connected equipment that provides equipment performance information to the MPM system of FIG. 6, according to some embodiments.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled_Water_Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PAN-OPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine a maintenance and replacement strategy for connected equipment 610. In some embodiments, the maintenance and replacement strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(\text{Load}_i)$$

where $\text{Load}_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $\text{Load}_i$, and $\eta_i$ is the operating efficiency of the device at time step i (e.g., $0 \le \eta_i \le 1$). The function $f(\text{Load}_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the maintenance and replacement strategy that minimizes the total combined cost J. In this way, the equipment purchase and maintenance recommendations generated by MPM system 602 may be specific to each group of connected equipment 610 in order to achieve the optimal cost J for that specific group of connected equipment 610. The equipment-specific recommendations may result in a lower overall cost J relative to generic preventative maintenance recommendations provided by an equipment manufacturer (e.g., service equipment every year) which may be sub-optimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
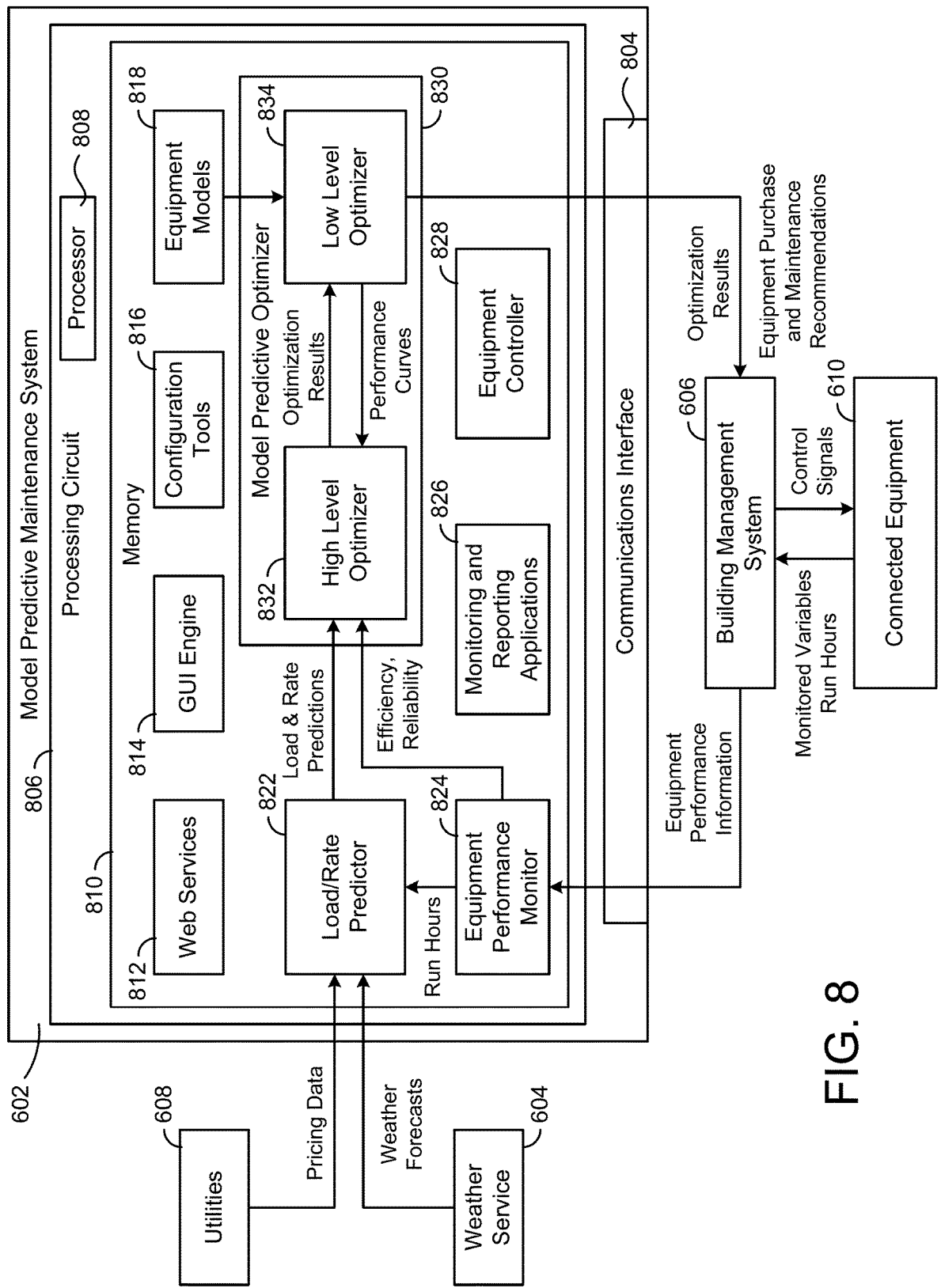
FIG. 8 is a block diagram illustrating the MPM system of FIG. 6 in greater detail, according to some embodiments.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function J for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency $\eta_i$ of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads ($Load_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads $Load_i$ as a function of the weather forecasts. In some embodiments, load/rate predictor 822 uses feedback from BMS 606 to predict loads $Load_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads $Load_i$ as a function of a given weather forecast ($\hat{\phi}_w$), a day type (day), the time of day (t), and previous measured load data ($Y_{i-1}$). Such a relationship is expressed in the following equation:

$$Load_i = f(\hat{\phi}_w, day, t | Y_{i-1})$$

In some embodiments, load/rate predictor 822 uses a deterministic plus stochastic model trained from historical load data to predict loads $Load_i$. Load/rate predictor 822 may use any of a variety of prediction methods to predict loads $Load_i$ (e.g., linear regression for the deterministic portion and an AR model for the stochastic portion). Load/rate predictor 822 may predict one or more different types of loads for the building or campus. For example, load/rate predictor 822 may predict a hot water load $Load_{Hot,i}$, a cold water load $Load_{Cold,i}$, and an electric load $Load_{Elec,i}$ for each time step i within the optimization period. The predicted load values $Load_i$ can include some or all of these types of loads. In some embodiments, load/rate predictor 822 makes load/rate predictions using the techniques described in U.S. patent application Ser. No. 14/717,593.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 822 may store the predicted loads $Load_i$ and the utility rates in memory 810 and/or provide the predicted loads $Load_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$, $B_{main,i}$, and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values $Load_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value $Load_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of $Load_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Optimizer

Figure 9:
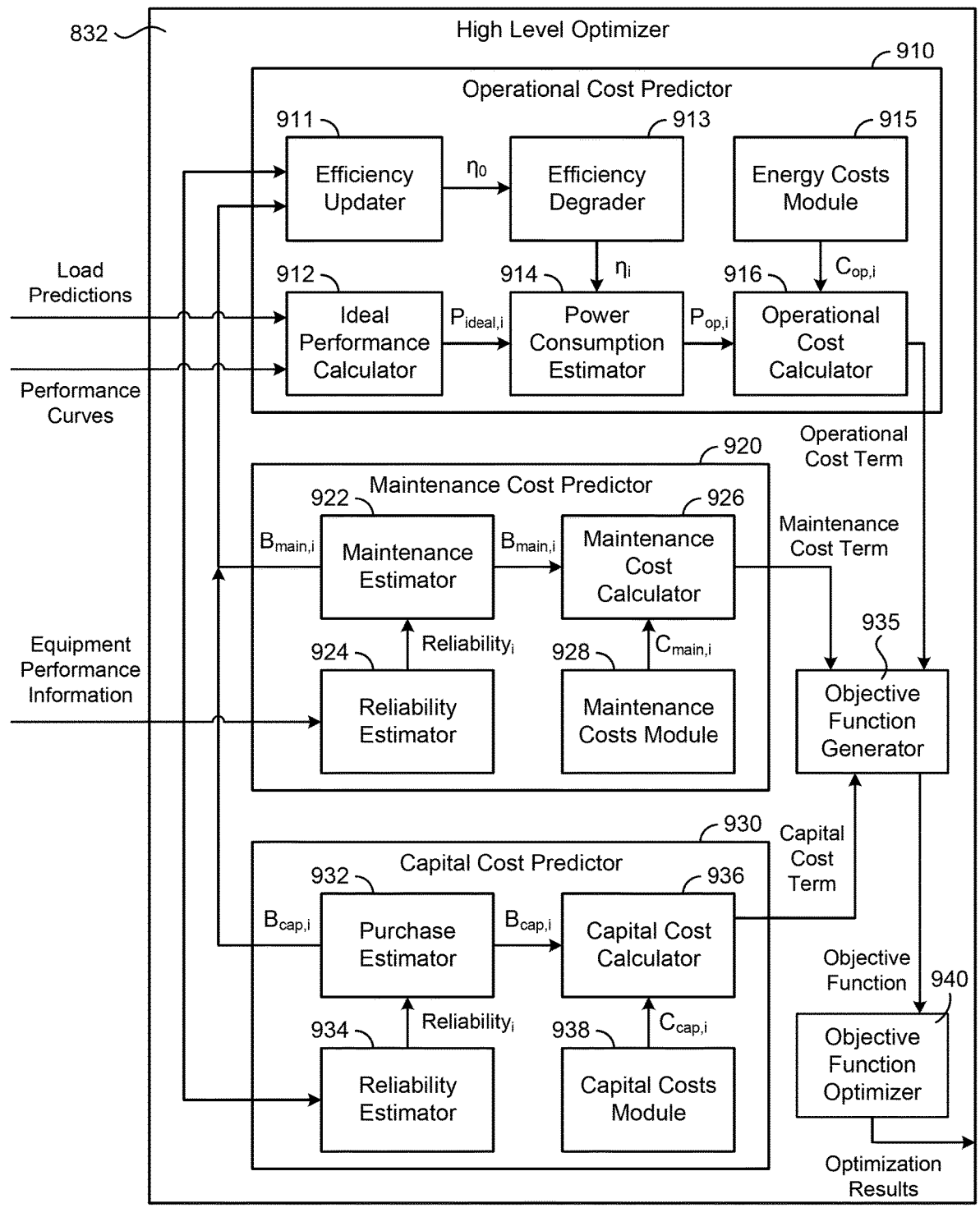
FIG. 9 is a block diagram illustrating a high level optimizer of the MPM system of FIG. 6 in greater detail, according to some embodiments.

Referring now to FIG. 9, a block diagram illustrating high level optimizer 832 in greater detail is shown, according to an exemplary embodiment. High level optimizer 832 can be configured to determine a recommended maintenance and replacement strategy for connected equipment 610. In some embodiments, the recommended maintenance and replacement strategy is a set of decisions which optimizes (e.g., reduces) the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op} = [C_{op,1} C_{op,2} \ldots C_{op,h}]$$

where the array $C_{op}$ has a size of 1×h and each element of the array $C_{op}$ includes an energy cost value $C_{op,i}$ for a particular time step i=1 ... h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i} = f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal} = [P_{ideal,1} P_{ideal,2} \ldots P_{ideal,h}]^T$$

where the array $P_{ideal}$ has a size of h×1 and each element of the array $P_{ideal}$ includes an ideal power consumption value $P_{ideal,i}$ for a particular time step i=1 h of the optimization period.

Still referring to FIG. 9, operational cost predictor 910 is shown to include an efficiency updater 911 and an efficiency degrader 913. Efficiency updater 911 can be configured to determine the efficiency η of connected equipment 610 under actual operating conditions. In some embodiments, the efficiency $\eta_i$ represents the ratio of the ideal power consumption $P_{ideal}$ of connected equipment to the actual power consumption $P_{actual}$ of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency η.

Efficiency updater 911 can be configured to periodically update the efficiency η to reflect the current operating efficiency of connected equipment 610. For example, efficiency updater 911 can calculate the efficiency η of connected equipment 610 once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, efficiency updater 911 updates the efficiency η each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency η at or before the beginning of the optimization period (e.g., at time step 0).

In some embodiments, efficiency updater 911 updates the efficiency $\eta_i$ for one or more time steps during the optimization period to account for increases in the efficiency η of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables in the objective function J. Similarly, the predicted time steps at which the equipment will be replaced may be defined by the values of the binary decision variables $B_{cap,i}$ in the objective function J.

Efficiency updater 911 can be configured to reset the efficiency $T_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$).

For example, if $B_{main,i}=1$, efficiency updater 911 can be configured to reset the value of $\eta_i$ to $\eta_{main}$ where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap}$, where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables $B_{main,i}$ and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_0$ is updated at the beginning of each optimization period. However, the efficiency η may degrade during the optimization period such that the initial efficiency value $\eta_0$ becomes increasingly inaccurate over the duration of the optimization period. To account for efficiency degradation during the optimization period, efficiency degrader 913 can decrease the efficiency η by a predetermined amount with each successive time step. For example, efficiency degrader 913 can define the efficiency at each time step i=1 h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ as previously described.

In some embodiments, the value of $\Delta\eta$ is based on a time series of efficiency values calculated by efficiency updater 911. For example, efficiency degrader 913 may record a time series of the initial efficiency values $\eta_0$ calculated by efficiency updater 911, where each of the initial efficiency values $\eta_0$ represents the empirically-calculated efficiency of connected equipment 610 at a particular time. Efficiency degrader 913 can examine the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, efficiency degrader 913 can calculate the rate of efficiency degradation as follows:

$$\frac{\Delta\eta}{\Delta t} = \frac{\eta_{0,2} - \eta_{0,1}}{t_2 - t_1}$$

where $$\frac{\Delta \eta}{\Delta t}$$

is the rate of efficiency degradation. Efficiency degrader 913 can multiply $$\frac{\Delta \eta}{\Delta t}$$

by the duration of each time step $\Delta t$ to calculate the value of $\Delta \eta$ $$\left(\text{i.e., } \Delta \eta = \frac{\Delta \eta}{\Delta t} * \Delta t\right).$$

In some embodiments, efficiency degrader 913 stores the efficiency values over the duration of the optimization period in an array $\eta$ including an element for each of the h time steps in the optimization period. For example, efficiency degrader 913 can generate the following array:

$$\eta = [\eta_1 \eta_2 \ldots \eta_h]$$

where the array $\eta$ has a size of 1×h and each element of the array $\eta$ includes an efficiency value $\eta_i$ for a particular time step i=1 . . . h of the optimization period. Each element i of the array may be calculated based on the value of the previous element and the value of $\Delta\eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i = \eta_{main}$ if $B_{cap,i}=1 \rightarrow \eta_i = \eta_{cap}$ if $B_{main,i}=0$ and $B_{cap,i}=0 \rightarrow \eta_i = \eta_{i-1} - \Delta\eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point $Load_i$, and $\eta_i$ is the operating efficiency of the device at time step i.

In some embodiments, power consumption estimator 914 stores the power consumption values as an array $P_{op}$ including an element for each of the h time steps in the optimization period. For example, power consumption estimator 914 can generate the following array:

$$P_{op} = [P_{op,1} P_{op,2} \ldots P_{op,h}]^T$$

where the array $P_{op}$ has a size of h×1 and each element of the array $P_{op}$ includes a power consumption value $P_{op,i}$ for a particular time step i=1 . . . h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$\text{Cost}_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, operational cost calculator 916 estimates the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$). Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$\text{Reliability}_i = f(\text{OpCond}_i, \Delta t_{main,i}, \Delta t_{cap,i})$$

where $\text{Reliability}_i$ is the reliability of connected equipment 610 at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which connected equipment 610 was purchased or installed and time step i. Reliability estimator 924 can be configured to identify the current operating conditions $\text{OpCond}_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1). Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, reliability estimator 924 can be configured to reset the value of $\text{Reliability}_i$ to $\text{Reliability}_{main}$, where $\text{Reliability}_{main}$ is the reliability value that is expected to result from the maintenance performed at time step i. Similarly, if $B_{cap,i}=1$, reliability estimator 924 can be configured to reset the value of Reliability to $\text{Reliability}_{cap}$, where $\text{Reliability}_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of $B_{main,i}=1$ in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables $B_{main,i}$ and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables $B_{main,i}$ and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main,j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main}=[C_{main,1} C_{main,2} \cdots C_{main,m}]$$

where the array $C_{main}$ has a size of 1×m and each element of the array $C_{main}$ includes a maintenance cost value $C_{main,j}$ for a particular maintenance activity j=1 ... m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, maintenance estimator 922 stores each of the different levels of $\eta_{main}$ and Reliability$_{main}$ in a corresponding array. For example, the parameter $\eta_{main}$ can be defined as an array $\eta_{main}$ with an element for each of the m different types of maintenance activities. Similarly, the parameter Reliability$_{main}$ can be defined as an array Reliability$_{main}$ with an element for each of the m different types of maintenance activities. Examples of these arrays are shown in the following equations:

$$\eta_{main}=[\eta_{main,1} \eta_{main,2} \cdots \eta_{main,m}]$$

$$\text{Reliability}_{main}=[\text{Reliability}_{main,1}\ \text{Reliability}_{main,2} \cdots \text{Reliability}_{main,m}]$$

where the array $\eta_{main}$ has a size of 1×m and each element of the array $\eta_{main}$ includes a post-maintenance efficiency value $\eta_{main,j}$ for a particular maintenance activity. Similarly, the array Reliability$_{main}$ has a size of 1×m and each element of the array Reliability$_{main}$ includes a post-maintenance reliability value Reliability$_{main,j}$ for a particular maintenance activity.

In some embodiments, efficiency updater 911 identifies the maintenance activity associated with each binary decision variable $B_{main,j,i}$ and resets the efficiency η to the corresponding post-maintenance efficiency level $\eta_{main,j}$ if $B_{main,j,i}=1$. Similarly, reliability estimator 924 can identify the maintenance activity associated with each binary decision variable $B_{main,j,i}$ and can reset the reliability to the corresponding post-maintenance reliability level Reliability$_{main,j}$ if $B_{main,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$\text{Cost}_{main,i}=C_{main,i}B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$\text{Cost}_{main} = \sum_{i=1}^{h} \text{Cost}_{main,i}$$

where $\text{Cost}_{main}$ is the maintenance cost term of the objective function J.

In other embodiments, maintenance cost calculator 926 estimates the maintenance cost $\text{Cost}_{main}$ by multiplying the maintenance cost array $C_{main}$ by the matrix of binary decision variables $B_{main}$ as shown in the following equations:

$$\text{Cost}_{main} = C_{main} B_{main}$$

$$\text{Cost}_{main} = [C_{main,1} \ C_{main,2} \ \cdots \ C_{main,m}]$$

$$\begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap} = [C_{cap,1} C_{cap,2} \cdots C_{cap,p}]$$

where the array $C_{cap}$ has a size of 1×p and each element of the array $C_{cap}$ includes a cost value $C_{cap,k}$ for a particular capital purchase k=1 . . . p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., $\text{Reliability}_{cap}$) may exist. Each level of $\eta_{cap}$ and $\text{Reliability}_{cap}$ may correspond to a different type of capital purchase.

In some embodiments, purchase estimator 932 stores each of the different levels of $\eta_{cap}$ and $\text{Reliability}_{cap}$ in a corresponding array. For example, the parameter $\eta_{cap}$ can be defined as an array $\eta_{cap}$ with an element for each of the p different types of capital purchases which can be made. Similarly, the parameter $\text{Reliability}_{cap}$ can be defined as an array $\text{Reliability}_{cap}$ with an element for each of the p different types of capital purchases that can be made. Examples of these arrays are shown in the following equations:

$$\eta_{cap} = [\eta_{cap,1} \eta_{cap,2} \cdots \eta_{cap,p}]$$

$$\text{Reliability}_{cap} = [\text{Reliability}_{cap,1}\ \text{Reliability}_{cap,2} \cdots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency $\eta$ to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{rap}$ by the matrix of binary decision variables $B_{cap}$ as shown in the following equations:

$$\text{Cost}_{cap} = C_{cap} B_{cap}$$

$$\text{Cost}_{cap} = [C_{cap,1}\ C_{cap,2}\ \cdots\ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op} P_{op} \Delta t + C_{main} B_{main} + C_{cap} B_{cap}$$

$$J = [C_{op,1}\ C_{op,2}\ \cdots\ C_{op,h}][P_{op,1}\ P_{op,2}\ \cdots\ P_{op,h}]^T \Delta t +$$

$$[C_{main,1}\ C_{main,2}\ \cdots\ C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1}\ C_{cap,2}\ \cdots\ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 ... h of the optimization period, the array $P_{op}$ includes a power consumption value $P_{op,i}$ for a particular time step i=1 ... h of the optimization period, each element of the array $C_{main}$ includes a maintenance cost value $C_{main,j}$ for a particular maintenance activity j=1 ... m, each element of the matrix $B_{main}$ includes a binary decision variable for a particular maintenance activity j=1 ... m at a particular time step i=1 ... h of the optimization period, each element of the array $C_{cap}$ includes a capital cost value $C_{cap,k}$ for a particular capital purchase k=1 ... p, and each element of the matrix $B_{cap}$ includes a binary decision variable for a particular capital purchase k=1 ... p at a particular time step i=1 ... h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency $\eta_i$ (e.g., $P_{op,i} = P_{ideal,i}/\eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function I to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, Cost is the cost incurred during time step i of the optimization period, and $NPV_{cost}$ is the net present value (i.e., the present cost) of the total costs incurred over the duration of the optimization period. In some embodiments, objective function optimizer 940 optimizes the net present value $NPV_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function J periodically (e.g., once per day, once per week, once per month, etc.) to dynamically update the predicted cost and/or the net present value $NPV_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
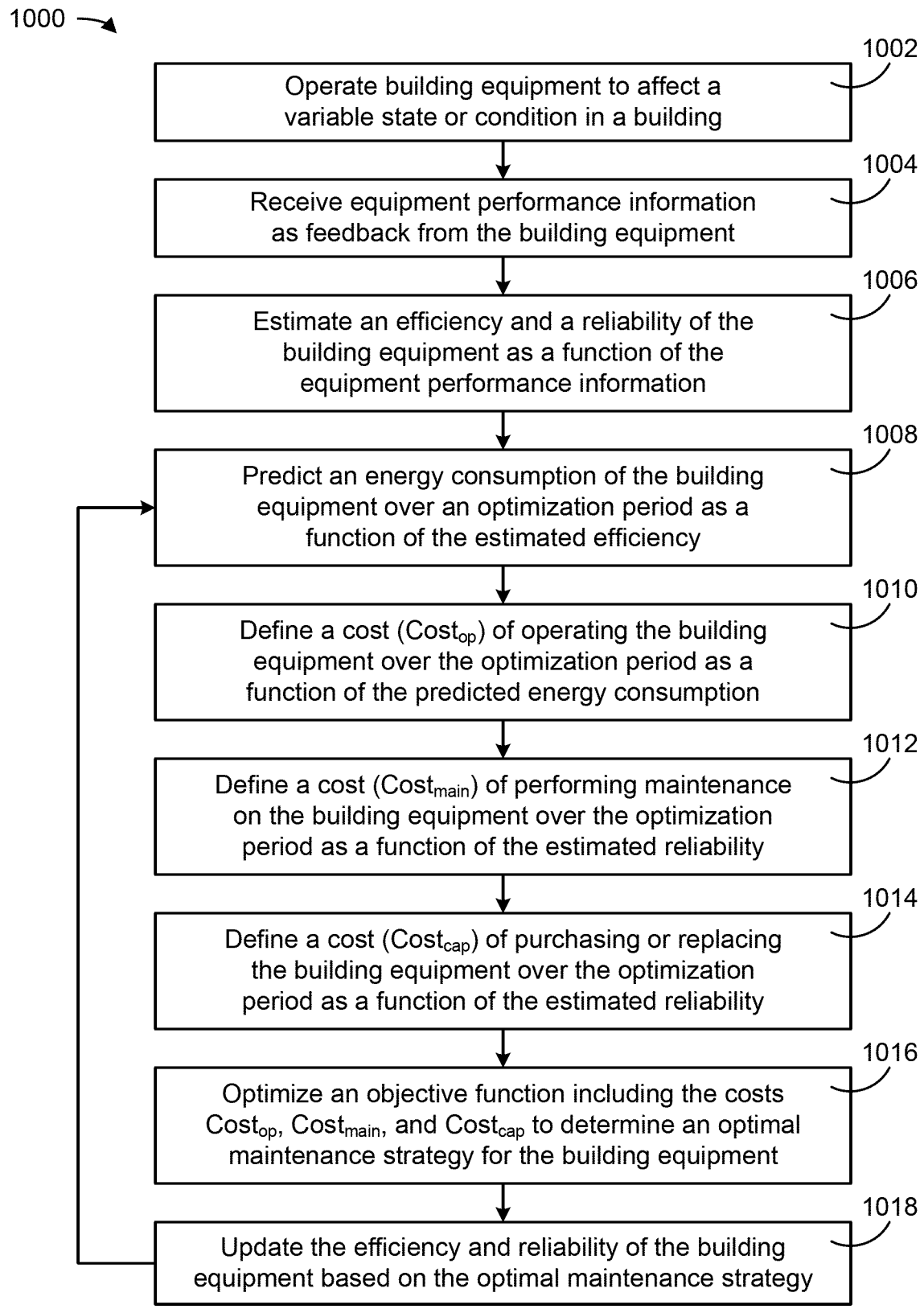
FIG. 10 is a flowchart of a process for operating the MPM system of FIG. 6, according to some embodiments.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency $\eta$ of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency $\eta$.

Step 1006 can include periodically updating the efficiency $\eta$ to reflect the current operating efficiency of the building equipment. For example, step 1006 can include calculating the efficiency $\eta$ of the building equipment once per day, once per week, once per year, or at any other interval as may be suitable to capture changes in the efficiency $\eta$ over time. Each value of the efficiency $\eta$ may be based on corresponding values of $P_{ideal}$ and $P_{actual}$ at the time the efficiency $\eta$ is calculated. In some embodiments, step 1006 includes updating the efficiency i each time the high level optimization process is performed (i.e., each time the objective function J is optimized). The efficiency value calculated in step 1006 may be stored in memory 810 as an initial efficiency value $\eta_0$, where the subscript 0 denotes the value of the efficiency $\eta$ at or before the beginning of the optimization period (e.g., at time step 0).

Step 1006 can include predicting the efficiency $\eta_i$ of the building equipment at each time step i of the optimization period. The initial efficiency $\eta_0$ at the beginning of the optimization period may degrade over time as the building equipment degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $t_h$ may be reset to either $\eta_{main}$ or $\eta_{cap}$ in step 1018.

In some embodiments, the value of $\Delta\eta$ is based on a time series of efficiency values. For example, step 1006 may include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Step 1006 can include multiplying $$\frac{\Delta\eta}{\Delta t}$$

by the duration of each time step $\Delta t$ to calculate the value of $\Delta \eta$ $$\left(\text{i.e.,} \Delta \eta = \frac{\Delta \eta}{\Delta t} * \Delta t\right).$$

Step 1006 can include estimating the reliability of the building equipment based on the equipment performance information received in step 1004. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure may be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where $\text{Reliability}_i$ is the reliability of the building equipment at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions $\text{OpCond}_i$ based on the equipment performance information received as a feedback from the building equipment. Operating under more strenuous conditions (e.g., high load, extreme temperatures, etc.) may result in a lower reliability, whereas operating under less strenuous conditions (e.g., low load, moderate temperatures, etc.) may result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions $\text{Load}_i$ from load/rate predictor 822 and performance curves from low level optimizer 834. As discussed above, the performance curves may define the ideal power consumption $P_{ideal}$ of the building equipment a function of the heating or cooling load on the device or set of devices. For example, the performance curve for the building equipment can be defined by the following equation:

$$P_{ideal,i} = f(\text{Load}_i)$$

where $P_{ideal,i}$ is the ideal power consumption (e.g., kW) of the building equipment at time step i and $\text{Load}_i$ is the load (e.g., tons cooling, kW heating, etc.) on the building equipment at time step i. The ideal power consumption $P_{ideal,i}$ may represent the power consumption of the building equipment assuming they operate at perfect efficiency. Step 1008 can include using the performance curve for the building equipment to identify the value of $P_{ideal,i}$ that corresponds to the load point $\text{Load}_i$ for the building equipment at each time step of the optimization period.

In some embodiments, step 1008 includes estimating the power consumption $P_{op,i}$ as a function of the ideal power consumption $P_{ideal,i}$ and the efficiency i of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $\text{Load}_i$, and $\eta_i$ is the operating efficiency of the building equipment at time step i.

Still referring to FIG. 10, process 1000 is shown to include defining a cost $\text{Cost}_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$\text{Cost}_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, step 1010 can include calculating the operational cost $\text{Cost}_{op}$ by multiplying the cost array $C_{op}$ by the power consumption array $P_{op}$ and the duration of each time step $\Delta t$ as shown in the following equations:

$$\text{Cost}_{op}=C_{op}P_{op}\Delta t$$

$$\text{Cost}_{op}=[C_{op,1}C_{op,2}\ldots C_{op,h}][P_{op,1}P_{op,2}\ldots P_{op,h}]^T\Delta t$$

where the array $C_{op}$ includes an energy cost value $C_{op,i}$ for a particular time step $i=1\ldots h$ of the optimization period, the array $P_{op}$ includes a power consumption value $P_{op,i}$ for a particular time step $i=1\ldots h$ of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$\text{Cost}_{main,i}=C_{main,i}B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$\text{Cost}_{main}=\sum_{i=1}^{h}\text{Cost}_{main,i}$$

where $\text{Cost}_{main}$ is the maintenance cost term of the objective function J.

In other embodiments, step 1012 includes estimating the maintenance cost $\text{Cost}_{main}$ by multiplying the maintenance cost array $C_{main}$ by the matrix of binary decision variables $B_{main}$ as shown in the following equations:

$$\text{Cost}_{main}=C_{main}B_{main}$$

$$\text{Cost}_{main}=[C_{main,1}\ C_{main,2}\ \cdots\ C_{main,m}]$$

$$\begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where each element of the array $C_{main}$ includes a maintenance cost value $C_{main,j}$ for a particular maintenance activity $j=1\ldots m$ and each element of the matrix $B_{main}$ includes a binary decision variable for a particular maintenance activity $j=1\ldots m$ at a particular time step $i=1\ldots h$ of the optimization period.

Still referring to FIG. 10, process 1000 is shown to include defining a cost $\text{Cost}_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost. Step 1014 can include using the purchase costs to define the values of $C_{cap,i}$ in objective function J.

Some capital purchases may be more expensive than other. However, different types of capital purchases may result in different levels of improvement to the efficiency η and/or the reliability of the building equipment. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

Step 1014 can include estimating the capital cost of the building equipment over the duration of the optimization period. In some embodiments, step 1014 includes calculating the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, step 1014 includes estimating the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \ C_{cap,2} \ \cdots \ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{main,p,h} \end{bmatrix}$$

where each element of the array $C_{cap}$ includes a capital cost value $C_{cap,k}$ for a particular capital purchase k=1 . . . p and each element of the matrix $B_{cap}$ includes a binary decision variable for a particular capital purchase k=1 . . . p at a particular time step i=1 . . . h of the optimization period.

Still referring to FIG. 10, process 1000 is shown to include optimizing an objective function including the costs Cost$_{op}$, Cost$_{main}$, and Cost$_{cap}$ to determine a recommended maintenance and replacement strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{amin,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, Δt is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [C_{op,1} \ C_{op,2} \ \cdots \ C_{op,h}][P_{op,1} \ P_{op,2} \ \cdots \ P_{op,h}]^T \Delta t +$$

$$[C_{main,1} \ C_{main,2} \ \cdots \ C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1} \ C_{cap,2} \ \cdots \ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{main,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency $\eta_i$ (e.g., $P_{op,i} = P_{ideal,i}/\eta_i$). Step 1016 can include imposing a constraint which defines the efficiency $\eta_i$ as a function of the binary decision variables $B_{main,i}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Step 1016 can include imposing a constraint which defines the reliability Reliability$_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function I can be defined as functions of random variables or probabilistic variables. For example, the decision variables $B_{main,i}$ and $B_{cap,i}$ can be defined as binary variables that have probabilistic values based on the reliability of the building equipment. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J may represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, step 1016 includes optimizing the net present value $NPV_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value $NPV_{cost}$ based on the closed-loop feedback from the building equipment.

In some embodiments, step 1016 include generating optimization results. The optimization results may include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results may cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $T_i$ for one or more time steps during the optimization period to account for increases in the efficiency η of the building equipment that will result from performing maintenance on the building equipment or purchasing new equipment to replace or supplement one or more devices of the building equipment. The time steps i at which the efficiency $η_i$ is updated may correspond to the predicted time steps at which the maintenance will be performed or the equipment will replaced. The predicted time steps at which maintenance will be performed on the building equipment may be defined by the values of the binary decision variables $B_{main,i}$ in the objective function J. Similarly, the predicted time steps at which the building equipment will be replaced may be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables $B_{main,i}$ and $B_{cap,i}$.

Step 1018 may include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, . . . , 1). Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, step 1018 may include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, . . . , 1). Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed may result in a lower reliability, whereas a short amount of time since the building equipment were purchased or installed may result in a higher reliability Some maintenance activities may be more expensive than other. However, different types of maintenance activities may result in different levels of improvement to the efficiency η and/or the reliability of the building equipment. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of the building equipment. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, step 1018 includes identifying the maintenance activity associated with each binary decision variable $B_{main,j,i}$ and resets the efficiency η to the corresponding post-maintenance efficiency level $\eta_{main,j}$ if $B_{main,j,i}=1$. Similarly, step 1018 may include identifying the maintenance activity associated with each binary decision variable $B_{main,j,i}$ and can reset the reliability to the corresponding post-maintenance reliability level Reliability$_{main,j}$ if $B_{main,j,i}=1$.

Some capital purchases may be more expensive than other. However, different types of capital purchases may result in different levels of improvement to the efficiency η and/or the reliability of the building equipment. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, step 1018 includes identifying the capital purchase associated with each binary decision variable $B_{main,k,i}$ and resetting the efficiency η to the corresponding post-purchase efficiency level $\eta_{cap,k}$ if $B_{cap,k,i}=1$. Similarly, step 1018 may include identifying the capital purchase associated with each binary decision variable $B_{cap,k,i}$ and can resetting the reliability to the corresponding post-purchase reliability level Reliability$_{cap,k}$ if $B_{main,k,i}=1$.

Model Predictive Maintenance with Short-Term Scheduling Overview

Referring generally to FIGS. 11-24B, systems, methods, and experimental results related to MPM with short-term scheduling functionality are shown, according to some embodiments. Short-term scheduling can refer to MPM optimizations that generate maintenance/replacement strategies over shorter time periods as compared to the long-term scheduling approach described above with reference to FIGS. 6-10. As described in greater detail below, the long-term optimization and the short-term optimization can share information to improve accuracy of maintenance and replacement schedules.

Maintenance and replacement schedules may include only maintenance activities, only replacement activities, or a combination of replacement and maintenance activities in various embodiments. Therefore, a schedule that defines only replacement activities may be considered a "maintenance and replacement schedule" as this term is used in the present disclosure. Similarly, a schedule that defines only maintenance activities may be considered a "maintenance and replacement schedule" as this term is used in the present disclosure. Finally, a schedule that defines a combination of both replacement and maintenance activities should be considered a "maintenance and replacement schedule."

The maintenance and replacement schedules can be used to initiate or prompt a variety of real-world actions at the building. For example, the maintenance and replacement schedules can be used to automatically initiate a maintenance or replacement activity, based on the maintenance and replacement schedules. In some embodiments, the maintenance and replacement schedules are used to automatically generate and/or transmit a work order or a party order to facilitate the maintenance or replacement of various equipment. In some embodiments, the maintenance and replacement schedules are used to automatically operate equipment (e.g., by generating and providing control signals for the equipment) in accordance with control decisions that are generated by performing the optimizations.

Component degradation in heating, ventilation, or air conditioning (HVAC) systems and/or other building systems can result in efficiency loss, thereby increasing costs for operating building equipment. Condition-based maintenance strategies (e.g., MPM) can determine when to schedule maintenance/replacement activities based on a condition of components. As such, condition-based maintenance can result in a dynamic maintenance scheduling strategy that can lead to lower energy cost and higher reliability of building equipment. However, various factors such as time-varying demand, fast-changing electricity price, and involved complex component models can significantly impact condition-based decisions. Integrating short-term scheduling with MPM (and/or another condition-based maintenance approach) can help alleviate some of the impact of these factors on accuracy of maintenance/replacement decisions. As used herein, the terms short-term scheduling and short-term optimization may be used interchangeably.

A primary objective of short-term scheduling can be to provide efficient maintenance and replacement schedules for cooling/heating systems while satisfying occupants' thermal comfort over a given short-term horizon. Short-term optimizations can utilize various information as input to generate a short-term maintenance and replacement schedule. For example, the short-term optimization may use various inputs such as system information (e.g., a configuration of systems, a system power model, a degradation impact model, component degradation information, etc.), pricing information describing a price of electricity and/or other resources, a cost of performing maintenance/replacement (e.g., a cost of components, a cost of labor, etc.), and a resource demand (e.g., a heating/cooling demand). In some embodiments, the system information details system dynamics describing how conditions in a building and/or a space change as a result of operation of building equipment. Apart from a forecast of resource demand that is assumed to be available, the other inputs described above can be transferred to linear constraints and into a model for the short-term optimization based on a given degradation predictive model and a given degradation impact model. Based on the linear constraints and other information, the short-term optimization can be performed to generate a short-term maintenance and replacement strategy that optimizes costs over the short-term horizon.

For simplicity, the short-term optimization may assume that a forecast of resource demand is available. However, the forecast of resource demand can be generated based on prior information describing resource demand. For example, a neural network and/or a different artificial intelligence (AI) model can be trained to predict resource demand based on information such as a size of a building, weather conditions, occupant habits, etc.

It should be appreciated that, as described herein, the term "optimal" may or may not indicate an ideal solution. As used herein, the term "optimal" can indicate a generated solution to a problem that is the best solution of solutions determined/identified. However, it should be appreciated that solutions better than an optimal solution may exist. In other words, an optimal solution may indicate a solution to an optimization problem that is obtained by performing an optimization process. The optimal solution may or may not, however, be a perfect solution that results in the absolute lowest costs possible. For example, if a short-term optimization utilizes time steps of one day, an optimal solution may result in a total expenditure of $5,000. However, an ideal solution may result in a total expenditure of $4,000, but can only be identified with even shorter time steps. As should be appreciated, the optimal solution may or may not be the same as the ideal solution. Further, while optimality of a solution may be frequently referred to with regards minimization of values (e.g., minimization of total costs), other optimality conditions can be set depending on a problem being solved. For example, optimality can be set as a maximization, a magnitude from a desired value, etc.

In terms of mathematical constructs described in detail below, lowercase italic letters can be used for indices, uppercase italic letters can be used for variables, uppercase bold letters can be used for sets, and lowercase italic Greek letters can be used for parameters. For representation of subsets, bold uppercase letters with subscripts are used. For example, h may represent all tasks i that can be performed in component j.

It should also be appreciated that, in some embodiments, replacement is considered a type of maintenance such that replacement is incorporated into maintenance considerations (or vice versa). In this case, replacement decisions may be considered a subset of maintenance decisions. However, maintenance and replacement are described separately below for clarity. Advantageously, the systems and methods described herein can be used to determine or provide optimal and efficient maintenance schedules for cooling/heating systems while satisfying an occupant's thermal comfort over a given short-term horizon.

Controller for Short-Term Scheduling

Figure 11:
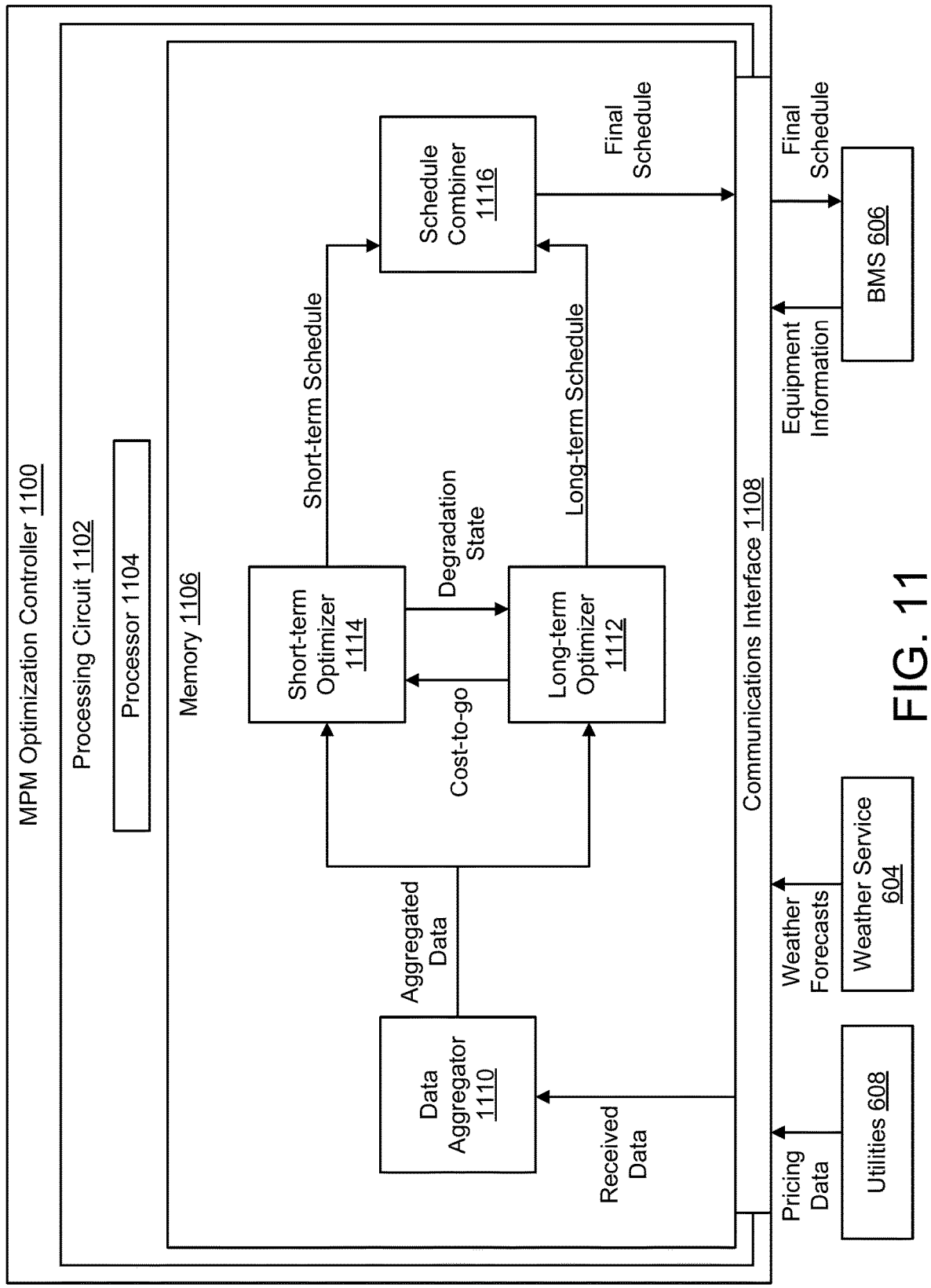
FIG. 11 is a block diagram of a short-term optimization controller including a short-term optimizer for performing short-term scheduling, according to some embodiments.

Referring now to FIG. 11, a block diagram of an MPM optimization controller 1100 for performing short-term scheduling is shown, according to some embodiments. In some embodiments, MPM optimization controller 1100 includes some and/or all of the functionality of MPM system 602 as described above with reference to FIGS. 6-10. As such, MPM optimization controller 1100 may be able to perform a standard optimization (i.e., a long-term optimization) as described above with reference to FIGS. 6-10.

MPM optimization controller 1100 is shown to include is shown to include a communications interface 1108 and a processing circuit 1102. Communications interface 1108 may include wired or wireless interfaces (e.g., jacks, antennas, transmitters, receivers, transceivers, wire terminals, etc.) for conducting data communications with various systems, devices, or networks. For example, communications interface 1108 may include an Ethernet card and port for sending and receiving data via an Ethernet-based communications network and/or a Wi-Fi transceiver for communicating via a wireless communications network. Communications interface 1108 may be configured to communicate via local area networks or wide area networks (e.g., the Internet, a building WAN, etc.) and may use a variety of communications protocols (e.g., BACnet, IP, LON, etc.).

Communications interface 1108 may be a network interface configured to facilitate electronic data communications between MPM optimization controller 1100 and various external systems or devices (e.g., utilities 608, weather service 604, BMS 606, etc.). For example, MPM optimization controller 1100 may receive pricing data from utilities 608 indicating a price of electricity, water, and/or other resources via communications interface 1108. In some embodiments, communications interface 1108 is configured to provide a maintenance and replacement schedule to BMS 606.

Still referring to FIG. 11, processing circuit 1102 is shown to include a processor 1104 and memory 1106. Processor 1104 may be a general purpose or specific purpose processor, an application specific integrated circuit (ASIC), one or more field programmable gate arrays (FPGAs), a group of processing components, or other suitable processing components. Processor 1104 may be configured to execute computer code or instructions stored in memory 1106 or received from other computer readable media (e.g., CDROM, network storage, a remote server, etc.).

Memory 1106 may include one or more devices (e.g., memory units, memory devices, storage devices, etc.) for storing data and/or computer code for completing and/or facilitating the various processes described in the present disclosure. Memory 1106 may include random access memory (RAM), read-only memory (ROM), hard drive storage, temporary storage, non-volatile memory, flash memory, optical memory, or any other suitable memory for storing software objects and/or computer instructions. Memory 1106 may include database components, object code components, script components, or any other type of information structure for supporting the various activities and information structures described in the present disclosure. Memory 1106 may be communicably connected to processor 1104 via processing circuit 1102 and may include computer code for executing (e.g., by processor 1104) one or more processes described herein. In some embodiments, one or more components of memory 1106 are part of a singular component. However, each component of memory 1106 is shown independently for ease of explanation.

Memory 1106 is shown to include a data aggregator 1110. Data aggregator 1110 can collect and aggregate data received from any various source. For example, data aggregator 1110 can collect and aggregate pricing data from utilities 608, weather forecasts from weather service 604, and/or equipment information (e.g., equipment performance information) from BMS 606. In some embodiments, data aggregator 1110 includes some and/or all of the functionality of load/rate predictor 822 and/or equipment performance monitor 824. As such, data aggregated by data aggregator 1110 may include information such as load and rate predictions, efficiency/reliability information regarding building equipment, etc. In essence, data aggregator 1110 can gather and aggregate any data that can be useful for performing short-term optimizations and/or long-term optimizations performed by short-term optimizer 1114 and long-term optimizer 1112 respectively. Further, data aggregator 1110 may perform various manipulations on the data to ensure the data is in a correct format(s) (e.g., converted from analog to binary signals, converted into JSON objects, etc.), in a correct order (e.g., chronological order), and/or otherwise manipulated based on needs of short-term optimizer 1114 and/or long-term optimizer 1112.

In some embodiments, data aggregator 1110 purges/deletes data that is determined to be irrelevant to short-term and/or long-term optimizations. For example, building equipment data associated with building devices not considered in either the short-term or long-term optimizations may be discarded by data aggregator 1110 due to lack of applicability to the optimizations. In some embodiments, removing unnecessary data improves processing efficiency of the optimizations as fewer variables may need to be considered.

Memory 1106 is also shown to include a long-term optimizer 1112. Long-term optimizer 1112 can be configured to perform a long-term optimization to generate a long-term maintenance and replacement schedule. In some embodiments, the long-term optimization is similar to and/or the same as the optimization performed by components of model predictive optimizer 830 as described above with reference to FIG. 8. As such, long-term optimizer 1112 may include some and/or all of the functionality of high level optimizer 832 and/or low level optimizer 834.

Long-term optimizer 1112 is shown to receive aggregated data form data aggregator 1110. Using the aggregated data, long-term optimizer 1112 can perform the long-term optimization to generate the long-term maintenance and replacement schedule. Long-term optimizer 1112 can utilize a dynamic programming based model (also referred to as a long-term model) that can be developed to provide maintenance and replacement schedules (e.g., for variable refrigerant flow (VRF) systems) over long-term horizons. In some embodiments, said long-term horizons span decades and include long time steps within. For example, a default long-term horizon may be set to 24 years with a default time step of one week. However, while longer time steps (e.g., weekly time steps) may improve computational efficiency, a resolution of degradation prediction may be sacrificed as a result. FIGS. 14A and 14B as described below illustrate the loss in resolution due to using longer time steps in greater detail. It should be appreciated that a weekly time step length is described purely for sake of example. The long-term optimization can utilize other time steps lengths (e.g., 6 days, 2 weeks, 3 weeks, monthly, etc.) depending on implementation. However, for purposes of the present disclosure, the long-term horizon should be longer than a short-term horizon described below. Likewise, time steps associated with the long-term horizon should be longer than time steps associated with the short-term horizon.

The long-term optimization performed by long-term optimizer 1112 may assume constant degradation in each time step (e.g., each week). However, time steps of a short-term horizon can reveal additional details of degradation evolution as compared to coarse degradation estimations associated with the long-term model. As such, long-term optimizer 1112 can supplement a short-term optimization to ensure optimal maintenance and replacement decisions are generated both over the short-term horizon and the long-term horizon. In some embodiments, the long-term optimization that can be performed by long-term optimizer 1112 is described in greater detail in U.S. Provisional Patent Application 62/883,508 filed Aug. 6, 2019, the entirety of which is incorporated by reference herein.

Memory 1106 is also shown to include a short-term optimizer 1114. Short-term optimizer 1114 can be configured to perform a short-term optimization to generate a short-term maintenance and replacement schedule. Similar to the long-term optimization 1110, the short-term optimization can be performed based on a short-term model that can be used to generate the short-term maintenance and replacement schedule. The short-term model can optimize (e.g., minimize) total costs over the short-term horizon including operational costs, maintenance costs, and replacement costs. In some embodiments, the short-term optimization is performed based on a mixed integer linear programming (MILP) model. In some embodiments, the short-term optimization is performed using a different type model. The short-term optimization can utilize a short-term horizon that is shorter than the long-term horizon of the long-term optimization performed by long-term optimizer 1112. Likewise, the short-term horizon can be associated with shorter time steps as compared to the long-term horizon. For example, short-term optimizer 1114 may perform the short-term optimization with a short-term horizon of one year and daily time steps. Advantageously, using the short-term model with daily time steps can allow maintenance/replacement tasks to be scheduled on a specific day as opposed to the long-term optimization which may schedule said tasks weekly. The short-term maintenance and replacement schedule can further allow optimization of labor allocation in the future.

Short-term optimizer 1114 is shown to receive a cost-to-go from long-term optimizer 1112. To avoid myopic schedules, the short-term optimization may be required to consider a long-term cost determined based on the long-term model. If only a cost within a given short-term horizon is considered, the short-term model may tend to provide short-term maintenance and replacement schedules without maintenance or replacement tasks being performed even if an initial degradation state is high. The lack of maintenance and replacement tasks may result from the fact that limited degradation may occur over short-term horizons. As such, short-term operational cost savings resulting from maintenance and replacement tasks may not compensate a comparatively large cost of labor and/or components required for the maintenance/replacement tasks.

To avoid myopic schedules, long-term optimizer 1112 can perform a backward calculation to generate the cost-to-go penalty (i.e., a total cost over the long-term horizon) of each possible degradation state at the end of the short-term horizon. The penalty corresponding to the degradation state at the end of the short-term horizon can be added to an objective function of the short-term model. By incorporating the cost-to-go penalty, the short-term model can generate short-term maintenance and replacement schedules that optimize (e.g., minimize) total costs over the long-term horizon, thereby avoiding myopic schedules.

It should be appreciated that although the short-term model is described in relation to VRF systems for sake of example; the short-term model can be applied to other building systems (e.g., other HVAC systems). Moreover, if other timescales instead of the daily timescale (i.e., daily time steps) is utilized, the logic (and the resulting formulations) associated with the short-term model may remain the same. In this case, only the definition of the set of time steps may need to be modified.

To generate the short-term maintenance and replacement strategy, short-term optimizer 1114 can perform an optimization technique similar to and/or the same as the optimization technique utilized by long-term optimizer 1112 and/or model predictive optimizer 830. Short-term optimizer 1114 is described in greater detail below with reference to FIG. 12.

As a result of generating the short-term maintenance and replacement schedule, short-term optimize 1114 can determine a degradation state at the end of the short-term horizon. Said degradation state can be provided back to long-term optimizer 1112. Based on the degradation state at the end of the short-term horizon, long-term optimizer 1112 can perform a forward calculation to generate a long-term maintenance and replacement schedule over the long-term horizon. Advantageously, providing the degradation state to long-term optimizer 1112 allows the long-term optimization to account for smaller-scale degradation over the short-term horizon, thereby allowing the long-term optimization to have a more acute understanding of degradation of equipment over time.

Short-term optimizer 1114 and long-term optimizer 1112 can provide the short-term and long-term maintenance and replacement schedules, respectively, to a schedule combiner 1116. Schedule combiner 1116 can concatenate the short-term and long-term schedules to generate a final maintenance and replacement schedule to be used as a basis for repairing building equipment (e.g., HVAC equipment, VRF equipment, etc.). By concatenating the short-term and long-term schedules, the final schedule can result in cost optimization over both the short-term horizon and the long-term horizon. The final schedule can be provided by schedule combiner 1116 to BMS 606 via communications interface 1108.

Combining the short-term and long-term optimization results to generate the final schedule has various advantages. For example, utilizing the short-term optimization and the long-term optimization in combination balances resolution of maintenance/replacement decisions with computational efficiency. In particular, the short-term optimization results in higher resolution in the short-term such that upcoming maintenance and replacements are determined with high accuracy. However, computational efficiency is maintained as, after the short-term horizon, predictions are based on longer time steps. As such, high resolution is achieved in the short-term whereas computational efficiency is maintained in the long-term.

Figure 12:
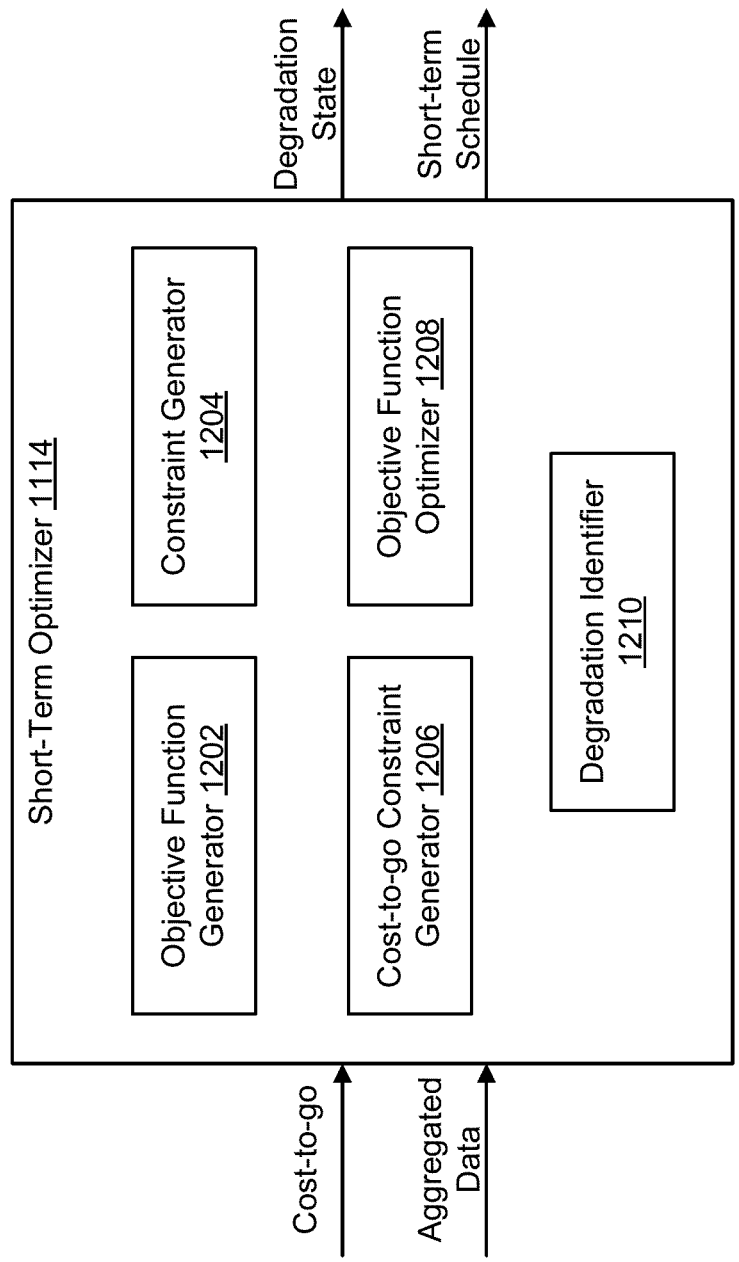
FIG. 12 is a block diagram of the short-term optimizer of FIG. 11 in greater detail, according to some embodiments.

Referring now to FIG. 12, short-term optimizer 1114 of FIG. 11 is shown in greater detail, according to some embodiments. As shown in FIG. 12, short-term optimizer 1114 can receive a cost-to-go penalty as well as aggregated data and can output a degradation state and a short-term maintenance and replacement schedule. It should be appreciated that the components of short-term optimizer 1114 as shown in FIG. 12 are given purely for sake of example. Short-term optimizer 1114 may include fewer, additional, and/or different components than as shown in FIG. 12. In essence, short-term optimizer 1114 can include any components necessary for generating the short-term schedule and determining the degradation state.

Short-term optimizer 1114 is shown to include an objective function generator 1202. In some embodiments, objective function generator 1202 is similar to and/or the same as objective function generator 935 as described with reference to FIG. 9. Further, objective function generator 1202 may include some and/or all of the functionality of operational cost predictor 910, maintenance cost predictor 920, and/or capital cost predictor 930. However, the objective function generated by objective function generator 1202 should be applicable to performing a short-term optimization as opposed to a long-term optimization which may be reflective of the objective function generated by objective function generator 935.

In some embodiments, objective function generator 1202 generates a short-term objective function $J_{st}$ that can be represented by the following equation:

$$J_{st} = \sum_{t \in T} \theta_t^E P_t + \sum_{j \in J} \sum_{i \in I_j} \sum_{t \in T} \theta_{i,j,t}^{MT} X_{i,j,t} + \sum_{t \in T} \theta_t^R Y_t + \sum_{n \in N} \left( \theta_n^{FIX} U_n + \sum_{j \in J} \theta_{j,n}^{VAR} W_{j,n} \right)$$

where $t \in T$ is a set of time steps within a short-term horizon, $j \in J$ is a set of components of building equipment, $i \in I_j$ is a set of maintenance tasks that can be performed for a component j, $n \in N$ is a set of interpolation regions for a piecewise linear approximation (explained in greater detail below), $\theta_t^E$ or is a price of electricity at time step t, $P_t$ represents electricity consumption at time step t, $\theta_{i,j,t}^{MT}$ is a maintenance cost of a maintenance task i for component j at time step t, $X_{i,j,t}$ is a binary variable indicating if the maintenance task i for component j occurs at time step t (e.g., $X_{i,j,t}=0$ indicates maintenance task i does not occur and $X_{i,j,t}=1$ indicates maintenance task i does occur), or is a system replacement cost at time step t, $Y_t$ is a binary variable indicating whether the system is replaced at time step t, $\theta_n^{FIX}$ is a fixed cost of the cost-to-go penalty if interpolation region n is selected, $\theta_{j,n}^{VAR}$ is a binary variable indicating whether the interpolation region n is selected, $\theta_{j,n}^{VAR}$ is a variable cost of the cost-to-go penalty based on the degradation states if the interpolation region n is selected, and $W_{j,n}$ indicates a degradation at a last time step (for piecewise linear approximations). Optimal values of decisions variables in the short-term objective function $J_{st}$ can be found by performing an optimization (e.g., a minimization) of $J_{st}$. In some embodiments, said optimization is performed by objective function optimizer 1208 as described in greater detail below.

In the above objective function, the term or $\theta_t^E P_t$ can represent a time-of-use charge, the second and the third term can represent maintenance and replacement costs respectively, and the last term can represent the cost-to-go penalty. As described in detail below, it may be advantageous to decompose the optimization problem into two subproblems. A first subproblem can include a situation where replacement is enforced whereas a second subproblem can include where replacement is forbidden for easier approximation due to a distinct shape of the cost-to-go penalty. As such, objective function generator 1202 can generate two separate objective functions for the respective subproblems which can be optimized separately (e.g., by an objective function optimizer 1210) to determine an optimized (e.g., minimized) total cost. If the optimization is decomposed into said subproblems, the objective function generated by objective function generator 1202 as shown above can be associated with the first subproblem where replacement is allowed. If replacement is forbidden, the term with $Y_t$ can be excluded. It should be noted that because the union of the feasible regions of the two subproblems is the same as the original problem, the decomposition may not undermine the quality of maintenance and replacement schedules obtained. Some impacts of problem decomposition are illustrated below with reference to FIG. 17.

In some embodiments, objective function generator 1202 incorporates additional considerations into the objective function. For example, objective function generator 1202 may incorporate predetermined schedules set by a user. To implement the predetermined schedules, objective function generator 1202 can adjust bounds of related binary variables. For example, if a user enforces maintenance of a filter to be performed on a $10^{th}$ day, objective function generator 1202 can set a lower bound of a variable related to said maintenance. In particular, objective function generator 1202 can set $X_{CleanFilter,Filter,10}=1$ during generation of the objective function. In some embodiments, objective function generator 1202 incorporates budget considerations by adding a constraint that limits a value of costs. For example, if the budget within the short-term horizon is less than $20000, objective function generator 1202 can directly include $\Sigma_{t \in T} \theta_t^E P^t = \Sigma_{j \in J} \Sigma_{i \in I_j} \Sigma_{t \in T} \theta_{i,j,t}^{MT} X_{i,j,t} + \Sigma_{j \in T} \theta_t^R Y^t \leq 20000$ in the short-term model. In some embodiments, budget constraints and the like are handled by a constraint generator 1204 described in greater detail below.

Short-term optimizer 1114 is also shown to include constraint generator 1204. Constraint generator 1204 can generate various constraints to impose on optimization of the objective function(s) generated by objective function generator 1202. The constraints generated by constraint generator 1204 can limit possible solutions to the objective function(s) that are in line with physical limitations and/or other limitations on solutions to the objective function(s).

Given available system information (e.g., VRF system information) included in the aggregated data, operation of the system can be considered as a whole. Thus, constraints related to system operation may be relatively simple and can be included to represent a given degradation impact model and a given power model. In particular, constraint generator 1204 can generate the following constraint for the degradation impact model:

$$F_{m,t} = \sum_{j \in J} \phi_{j,m} D_{j,t} + \psi_m \quad \forall m \in M, t \in T$$

where $m \in M$ is a set of degradation impact indices, $F_{m,t}$ is a degradation impact variable for a degradation impact index m at time step t, $\phi_{j,m}$ is a component-dependent coefficient in the degradation impact constraints for component j and degradation impact index m, $D_{j,t}$ is a total degradation of component j at time step t, $\psi_m$ is a component-independent coefficient in the degradation impact constraints for degradation impact index m, and all other variables are as described above. At this stage, the system degradation impact variables $F_{m,t}$ (where $m \in M$ denotes the set of degradation impact variables) can be a linear function of the component degradation states $D_{j,t}$. Constraint generator 1204 can also generate the following constraint for the power model:

$$P_t = \sum_{m \in M} \pi_{m,t} F_{m,t} \quad \forall t \in T$$

where $\pi_{m,t}$ is a coefficient in the power model constraints, and all other variables are as described above. In this way, the electricity consumption $P_t$ can be calculated based on the degradation impact variables. The above two constraints can illustrate an assumption that the degradation impact model and the power model are in linear forms. If the models are update to complex nonlinear or nonconvex forms, piecewise linear approximation can be utilized to modify the above constraints.

As an example, if a neural-network-based degradation impact model is embedded in the MPM framework, the degradation impact model can still be included with the MILP optimization model (i.e., the short-term model) even though the neural-network-based degradation impact model may be highly nonlinear. The neural-network-based degradation impact model may utilize radial basis functions as activation functions such that an output of the neural-network-based degradation impact model may be the summation of the weighted activation functions. In certain situations, the radial basis functions utilized can be approximated as piecewise linear functions according to the shapes of the functions. As such, the degradation impact variables $F_{m,t}$ can still be represented as linear combinations of the degradation states.

In some embodiments, degradation of building equipment can be defined by recoverable degradation and permanent degradation. Recoverable degradation can be recovered (e.g., reduced) by performing maintenance tasks on the building equipment. However, permanent degradation may only be "recovered" by performing replacement tasks (i.e., maintenance tasks may not fix permanent degradation). Total degradation $D_{j,t}$ can thus be represented by the sum of recoverable degradation and permanent degradation $D_{j,t}^P$.

By accounting for $D_{j,t}$ and $D_{j,t}^P$, compatibility between the long-term model and the short-term model can be maintained.

Both permanent degradation and recoverable degradation may increase with operations and can be recovered by the corresponding maintenance tasks or system replacement. In particular, total degradation $D_{j,t}$ can be represented by the following equation:

$$D_{j,t} = D_{j,t-1} + \alpha_{j,t}\eta_t - \sum_{i \in I_j} R_{i,j,t} \quad \forall j \in J, t \in T$$

where $D_{j,t-1}$ is a total degradation at a previous time step, $\alpha_{j,t}$ is a rate of degradation for component j and time step t, $\eta_t$ is a system operating time for time step t (i.e., a length of time step t), $R_{i,j,t}$ is a health recovery amount for maintenance task i on component j at time step t, and all other variables are as defined above. In effect, the above equation can represent evolution of the degradation over time. As components degrade with operation, the degradation is decreased by $R_{j,t}$ once certain maintenance tasks or system replacement tasks are executed. If a maintenance task or system replacement is executed, $R_{j,t}$ may be equal to a specific value to let $D_{j,t}=D_{j,t}^P+\alpha_{j,t}\eta_t$ (i.e., the total degradation $D_{j,t}$ equals the sum of the permanent degradation $D_{j,t}^P$ and the degradation during time step t).

Based on the above equation for $D_{j,t}$, constraint generator 1204 can generate the following constraints:

$$R_{i,j,t}+R_{i,j,t}^{SL}=D_{j,t-1}-D_{j,t}^P \forall i \in I_j \forall j \in J_i, t \in T$$

$$R_{i,j,t} \leq (X_{i,j,t}+Y_{j,t})(\delta_j^{MAX}-\delta_j^{MIN}) \forall i \in I_j \forall j \in J_i, t \in T$$

$$R_{i,j,t}^{SL} \leq (1-X_{i,j,t}-Y_{j,t})(\delta_j^{MAX}-\delta_j^{MIN}) \forall i \in I_j \forall J_i, t \in T$$

where $j \in J_i$ is a component that can perform maintenance task i, $R_{i,j,t}^{SL}$ is a slack variable health recovery for a maintenance task i on component j and time step t, $\delta_j^{MAX}$ and $\delta_j^{MIN}$ are a maximum and minimum degradation state respectively, and all other variables are as defined above. In this case, an initial degradation state $\delta_j^0$ can be defined for component j. The above constraints can constrain a value of $R_{i,j,t}$. The slack variable $R_{i,j,t}^{SL}$ can be used to formulate the constraints in convex-hull form for better computation efficiency. The above constraints can illustrate that only one of $R_{i,j,t}$ and $R_{i,j,t}^{SL}$ is nonzero. According to the above three constraints, when $X_{i,j,t}=0$ and $Y_{j,t}=0$, the corresponding $R_{i,j,t}=0$ and the slack variable $R_{i,j,t}^{SL}=D_{j,t-1}-D_{j,t}^P$. If a certain maintenance task is not executed, there may be no corresponding recovery. On the contrary, $X_{i,j,t}=1$ or $Y_{j,t}=1$ leads to $R_{i,j,t}=D_{j,t-1}-D_{j,t}^P$ and $R_{i,j,t}^{SL}=0$, which can indicate that the recovery may fully eliminate the recoverable degradation (i.e., $D_{j,t}=D_{j,t}^P+\alpha_{j,t}\eta_t$ as mentioned previously).

In some embodiments, constraint generator 1204 generates the following constraints:

$$D_{j,t}^P=DY_{j,t-1}+\delta_j^{MIN}Y_{j,t}+\alpha_j^P\eta_t(1-Y_{j,t}) \forall j \in J, t \in T$$

$$DY_{j,t}+DY_{j,t}^{SL}=D_{j,t}^P \forall j \in J, t \in T$$

$$DY_{j,t} \leq (1-Y_{j,t+1})\delta_j^{MAX} \forall j \in J, t \in T$$

$$DY_{j,t}^{SL} \leq Y_{j,t+1}\delta_j^{MAX} \forall j \in J, t \in T$$

where $DY_{j,t}$ is a variable to calculate a product of $D_{j,t}$ and $Y_t$, $DY_{j,t}^{SL}$ is a slack variable for $DY_{j,t}$, and all other variables are as defined above. The above four constraints can constrain evolution of permanent degradation. In particular, the first constraint can link the permanent degradation with system replacement. Similar to the constraints defined for the calculation of $R_{i,j,t}$ above, the last three constraints can utilize the convex-hull form for better computational efficiency. According to these constraints, if $Y_{j,t}=0$, then $DY_{j,t-1}=D_{j,t-1}^P$ because $DY_{j,t-1}^{SL}=0$ and thus $D_{j,t}^P=D_{j,t-1}^P+\alpha_j^P\eta^t$. In this case, the permanent degradation increases with operation and no recovery occurs. On the contrary, if $Y_{j,t}=1$, then $DY_{j,t-1}=0$ and thus $D_{j,t}^P=\delta_j^{MIN}$. In other words, the permanent degradation can be reduced to the minimum value of $\delta_j^{MIN}$ if $Y_{j,t}=1$. If combined with the constraints/equations defined above for $D_{j,t}$ and $R_{i,j,t}$, $D_{j,t}=D_{j,t}^P+\alpha_j$, $\eta_t=\delta_j^{MIN}+\alpha_{j,t}\eta_t$ if $Y_{j,t}=1$. In other words, total degradation can be fully recovered if system replacement is performed.

Still referring to FIG. 12, short-term optimizer 1114 is shown to include a cost-to-go constraint generator 1206. In some embodiments, cost-to-go constraint generator 1206 is a component of constraint generator 1204. However, cost-to-go constraint generator 1206 is shown separately for ease of explanation. Cost-to-go constraint generator 1206 can generate and impose a cost-to-go penalty constraint on the short-term model optimized by short-term optimizer 1114.

To account for long-term effects of short-term scheduling decisions, the cost-to-go penalty obtained from the long-term model can be considered in optimization of the short-term model. The cost-to-go penalty may be equivalent to a long-term total cost during the remaining years of the long-term horizon (i.e., excluding the cost during the short-term horizon) given degradation states at the end of the short-term horizon. In some embodiments, the cost-to-go penalty is represented mathematically as a high-dimensional function of the component degradation and the system replacement decision. To fit the MILP model (i.e., the short-term model), piecewise linear approximation can be used to approximate the high-dimensional function. Using this method, the domain of a specific function is divided into finite subdomains such that the function in each domain can be approximated as a linear function. In some embodiments, if implementing the piecewise linear approximation method, a value of the function at a given point is approximated as a convex combination of the values at vertices of the subdomain that the points belongs to. However, said approximation may undermine the computational efficiency of the short-term model as the domain of the cost-to-go penalty may need to be divided to a large number of subdomains due to its high dimensionality.

To simplify the approximation, knowledge of linear regression and approximation steps can be combined. In particular, the domain of the cost-to-go penalty can be divided into subdomains according to a shape of the function. In some embodiments, said division is performed using nonlinear optimization. The function in each subdomain can be fitted as a linear function of the variables. In some embodiments, said fitting is performed by a linear regression algorithm. Finally, for a given point in the domain, the value of the function can be calculated according to the linear function of the subdomain with which the point belongs to.

To capture the above intricacies of the cost-to-go penalty, cost-to-go constraint generator 1206 can generate the following constraints to impose on the short-term model:

$$\sum_{n \in N} U_n = 1$$

$$\underline{\delta}_{j,n} U_n \leq W_{j,n} \leq \overline{\delta}_{j,n} U_n \ \forall \ j \in J$$

$$D_{j,|T|} = \sum_{n \in N} W_{j,n} \ \forall \ j \in J$$

where binary variable $U_n=1$ if the subdomain $n \in N$ is selected, $W_{j,n}$ is the continuous variable that denotes the values of degradation states if the corresponding subdomain is selected, and all other variables are as described above. The first of the above three constraints can indicate that exactly one active subdomain is chosen. Further, the second two constraints can indicate the subdomain n is selected only if the corresponding $W_{j,n}$, which is bounded, equals the value of $D_{j,|T|}$ (i.e., the value of the degradation at the end of the short-term horizon). $U_n$ and $W_{j,n}$ corresponding to the active subdomain can be included in the objective function to approximate the cost-to-go penalty. In the objective function, for each $n \in N$, the term $\theta_n^{FIX} U_n + \Sigma_{j \in J} \theta_{j,n}^{VAR} W_{j,n}$ can represent the linear function that approximates the original cost-to-go penalty in the corresponding subdomain. It should be appreciated that the cost-to-go penalty can show a distinct shape when replacement is forbidden and when replacement is enforced. In some embodiments, the domain of the cost-to-go penalty is divided into different subdomains. As such, $\in N$ may be different for the two subproblems.

As described in greater detail above, the optimization problem can be decomposed into two subproblems due to the distinct shapes of the cost-to-go penalty function. As such, cost-to-go constraint generator 1206 may impose the following constraints on the short-term model:

$$\sum_t Y_t = 1 \ \forall \ t \in T$$

$$\sum_t Y_t = 0 \ \forall \ t \in T$$

In this way, exactly one replacement is performed over the short-term horizon in the subproblem where replacement is enforced and no replacements are performed over the short-term horizon in the subproblem where replacement is forbidden. Moreover, for the subproblem where system replacement is forbidden, an upper bound of $Y_t$ can be set to zero by cost-to-go constraint generator 1202 to improve computational performance. In some embodiments, for the subproblem where replacement is forbidden, $Y_t$ is eliminated, thereby leading to minor modifications of model formulations to not include $Y_t$.

Short-term optimizer 1114 is also shown to include an objective function optimizer 1208. Objective function optimizer 1208 can perform a short-term optimization to optimize the objective function generated by objective function generator 1202 respective of constraints generated by constraint generator 1204 and cost-to-go constraint generator 1206. In some embodiments, objective function optimizer 1208 includes some and/or all of the functionality of objective function optimizer 940 as described with reference to FIG. 9.

In some embodiments, objective function optimizer 1208 utilizes mixed integer linear programming to optimize the MILP model (i.e., the short-term model). In this way, objective function optimizer 1208 can generate an optimal solution to the objective function that optimizes total costs over the short-term horizon. The optimal solution can indicate a short-term maintenance and replacement schedule that results in optimal total costs. In some embodiments, if the optimization problem is decomposed into the two subproblems described above, objective function optimizer 1208 optimizes two objective functions (i.e., one objective function for each subproblem) and selects a schedule of the two schedules generated with a more optimized total cost (e.g., a schedule with a lower total cost). As described above, optimizing the two objective functions separately may not undermine quality of the maintenance and replacement schedules obtained as the union of feasible regions of the two subproblems is the same as the original problem.

Short-term optimizer 1114 is also shown to include a degradation identifier 1210. Based on the optimal solution to the objective function determined by objective function optimizer 1208, degradation identifier 1210 can identify a degradation state at the end of the short-term horizon. The degradation state at the end of the short-term horizon can be utilized by long-term optimizer 1112 as described above with reference to FIG. 11 to perform the long-term optimization. In this way, the long-term optimization can utilize the finer optimization details identified in the short-term optimization as opposed to blindly performing the long-term optimization without any information.

Processes for Short-Term Scheduling

Figure 13:
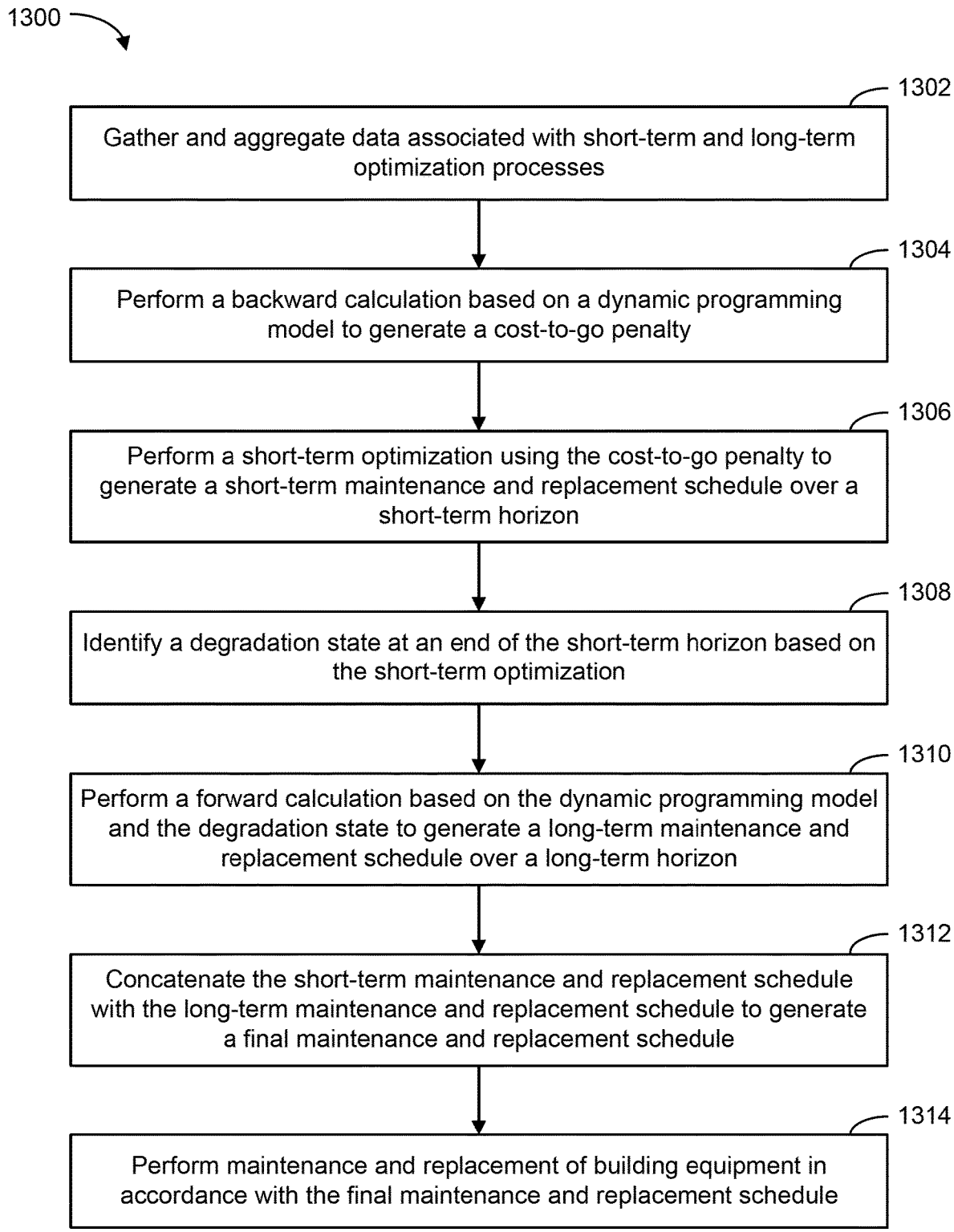
FIG. 13 is a flow diagram of a process for performing short-term scheduling of maintenance and replacement for building equipment, according to some embodiments.

Referring now to FIG. 13, a process 1300 for performing short-term scheduling of maintenance and replacement for building equipment is shown, according to some embodiments. By performing process 1300, an optimal maintenance and replacement schedule can be identified that optimizes total costs over an optimization period including a short-term horizon and a long-term horizon. In some embodiments, some and/or all steps of process 1300 are performed by MPM optimization controller 1100 and/or BMS 606.

Process 1300 is shown to include gathering and aggregating data associated with short-term and long-term optimization processes (step 1302). The data gathered and aggregated in step 1302 can include any various information that may be applicable to optimization of objective functions in either short-term and/or long-term optimizations. For example, the data can include pricing data of utilities (e.g., electricity, water, gas, etc.), weather forecasts, equipment performance information, etc. In some embodiments, step 1302 includes purging data that is determined to be irrelevant to said optimizations. For example, building equipment data associated with building devices not considered in either the short-term or long-term optimizations may be discarded due to lack of applicability to the optimizations. Removing unnecessary data can improve processing efficiency of the optimizations as fewer variables may need to be considered. In some embodiments, step 1302 is performed by data aggregator 1110.

Process 1300 is shown to include performing a backward calculation based on a dynamic programming model to generate a cost-to-go penalty (step 1304). The dynamic programming model (i.e., a long-term model) can be used to generate a long-term maintenance and replacement schedule for building equipment. In step 1304, the backward calculation is performed to generate the cost-to-go penalty (i.e., a total cost over the long-term horizon) of every degradation state at the end of the short-term horizon. Determining the cost-to-go penalty may be critical to ensure that a short-term optimization optimizes costs over both the short-term horizon and the long-term horizon. In some embodiments, step 1304 is performed by long-term optimizer 1112.

Process 1300 is shown to include performing a short-term optimization using the cost-to-go penalty to generate a short-term maintenance and replacement schedule over a short-term horizon (step 1306). The short-term optimization can be performed to optimize an objective function describing costs associated with operating the building equipment along with maintaining and replacing the building equipment. The short-term optimization may be performed subject to constraints on the objective function to limit a set of possible solutions to the optimization. In some embodiments, step 1306 includes performing two optimizations. In this case, a first optimization may include optimizing an objective function that enforces replacement of building equipment whereas a second optimization may include optimizing an objective function where replacement is forbidden. If two optimizations are performed, the short-term maintenance and replacement schedule can be selected based on a more optimal solution of the two optimizations. In some embodiments, step 1306 is performed by short-term optimizer 1114.

Process 1300 is shown to include identifying a degradation state at an end of the short-term horizon based on the short-term optimization (step 1308). As a result of generating the short-term maintenance and replacement schedule in step 1306, the short-term maintenance and replacement schedule can indicate a final degradation state at the end of the short-term horizon that correlates with performing maintenance/replacement in accordance with the short-term schedule. In some embodiments, multiple degradation states are identified (e.g., degradation states of each device of building equipment). The degradation at the end of the short-term horizon can be utilized in performing a long-term optimization such that decisions related to the short-term optimization area accounted for the in the long-term optimization. In some embodiments, step 1308 is performed by short-term optimizer 1114.

Process 1300 is shown to include performing a forward calculation based on the dynamic programming model and the degradation state to generate a long-term maintenance and replacement schedule over a long-term horizon (step 1310). In effect, step 1310 includes performing a long-term optimization based on the degradation state identified in step 1308. By accounting for the degradation state, the long-term optimization can realize more accurate optimization results that further optimize costs. In some embodiments, step 1310 is performed by long-term optimizer 1112.

Process 1300 is shown to include concatenating the short-term maintenance and replacement schedule with the long-term maintenance and replacement schedule to generate a final maintenance and replacement schedule (step 1312). The concatenation performed in step 1312 can ensure that any maintenance/replacement decisions of the short-term maintenance and replacement schedule are reflected in view of the long-term maintenance and replacement schedule. In this way, the final maintenance and replacement schedule may optimize total cost over both the short-term horizon and the long-term horizon. In some embodiments, step 1312 is performed by schedule combiner 1116.

Process 1300 is shown to include performing maintenance and replacement of building equipment in accordance with the final maintenance and replacement schedule (step 1314). By adhering to the final schedule, building equipment can be maintained/replaced at optimal times to optimize (e.g., minimize) total costs. Advantageously, as a result of performing the short-term optimization, maintenance/replacement tasks during the short-term horizon may be scheduled daily as opposed to weekly as would otherwise be determined if only the long-term optimization were performed. This can lead to optimal cost savings over an optimization period including the short-term horizon and the long-term horizon. In some embodiments, step 1314 is performed by BMS 606 and/or some other entity responsible for performing maintenance/replacement of the building equipment.

Figure 14:
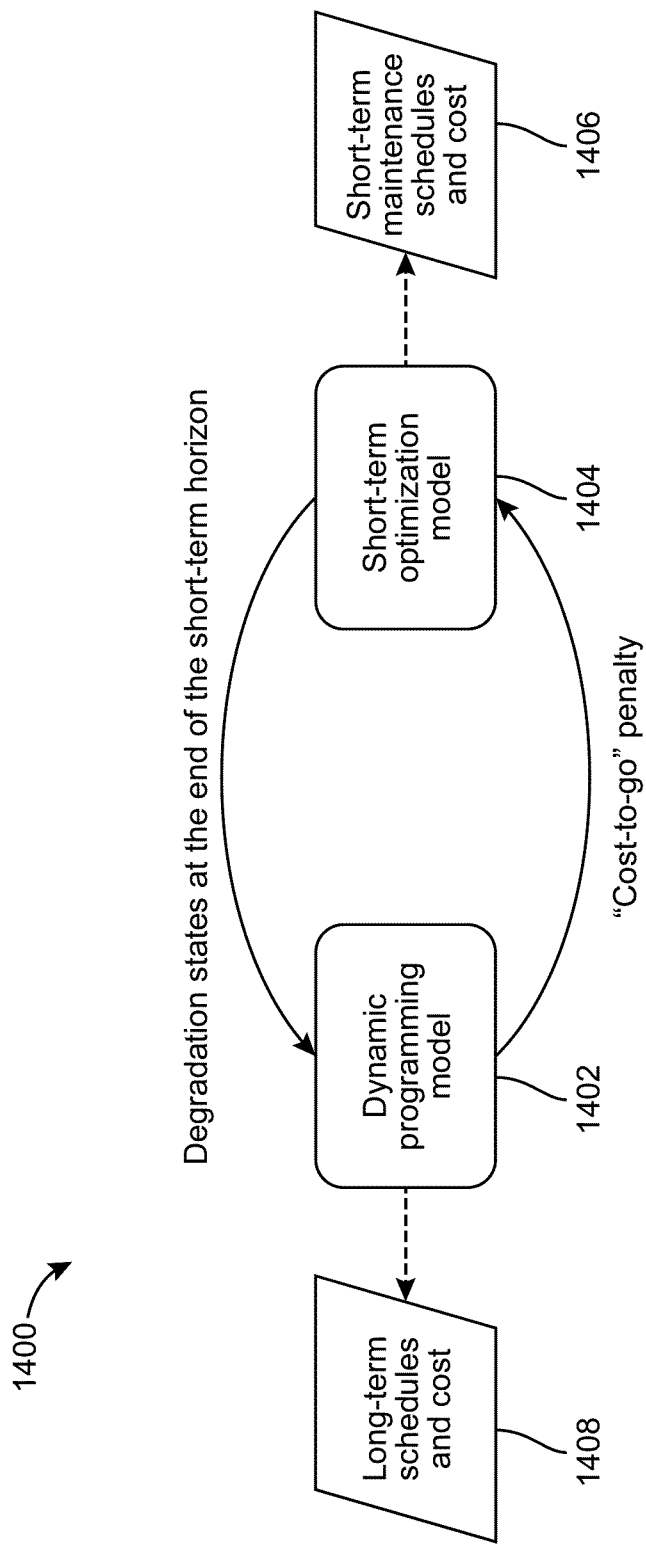
FIG. 14 is a flow diagram of a process for integrating a short-term optimization with a long-term optimization, according to some embodiments.

Referring now to FIG. 14, a process 1400 for integrating a short-term optimization with a long-term optimization is shown, according to some embodiments. In some embodiments, process 1400 further illustrates steps 1304-1310 of process 1300 as described with reference to FIG. 13. In particular, process 1400 can illustrate how the short-term optimization and long-term optimization exchange information to supplement each other and improve results associated therewith. In some embodiments, some and/or all of process 1400 is performed by MPM optimization controller 1100.

In process 1400, a dynamic programming model 1402 can be used to perform a backward calculation to generate a cost-to-go penalty (i.e., the total cost over the long-term future) of every possible degradation state at the end of the short-term horizon. The cost-to-go penalty can be provided for use in optimizing a short-term optimization model 1404. The optimization of short-term optimization model 1404 can result in generation of a short-term maintenance schedule and cost 1406. Of course, the short-term maintenance schedule and cost 1406 can define replacement tasks as well as maintenance tasks. The cost defined by short-term maintenance schedule and cost 1406 can indicate a total cost of maintenance and replacement over the short-term horizon. As a result of optimizing short-term optimization model 1404, degradation states at the end of the short-term horizon can be identified. Said degradation states can be provided back to dynamic programming model 1402 such that a long-term optimization can be performed to generate a long-term schedule and cost 1408. Long-term schedule and cost 1408 can define maintenance and replacement tasks over a long-term horizon. As should be appreciated by process 1400, optimizations of the long-term model (i.e., dynamic programming model 1402) and the short-term model (i.e., short-term optimization model 1404) can provide feedback to one another in order to ensure more optimal maintenance and replacement strategies are generated both for both the short-term horizon and the long-term horizon.

Experimental Results

Referring generally to FIGS. 15A-24B, experimental results associated with performing short-term scheduling in the MPM framework are shown and described, according to some embodiments. It should be appreciated that the experimental results are provided purely for sake of example. In practice, results of performing short-term scheduling in the MPM framework can vary depending on building systems, environmental conditions, pricing, and/or various other factors. The experimental results described in FIGS. 15A-24B were generated using MPM optimization controller 1100.

Figure 15A:
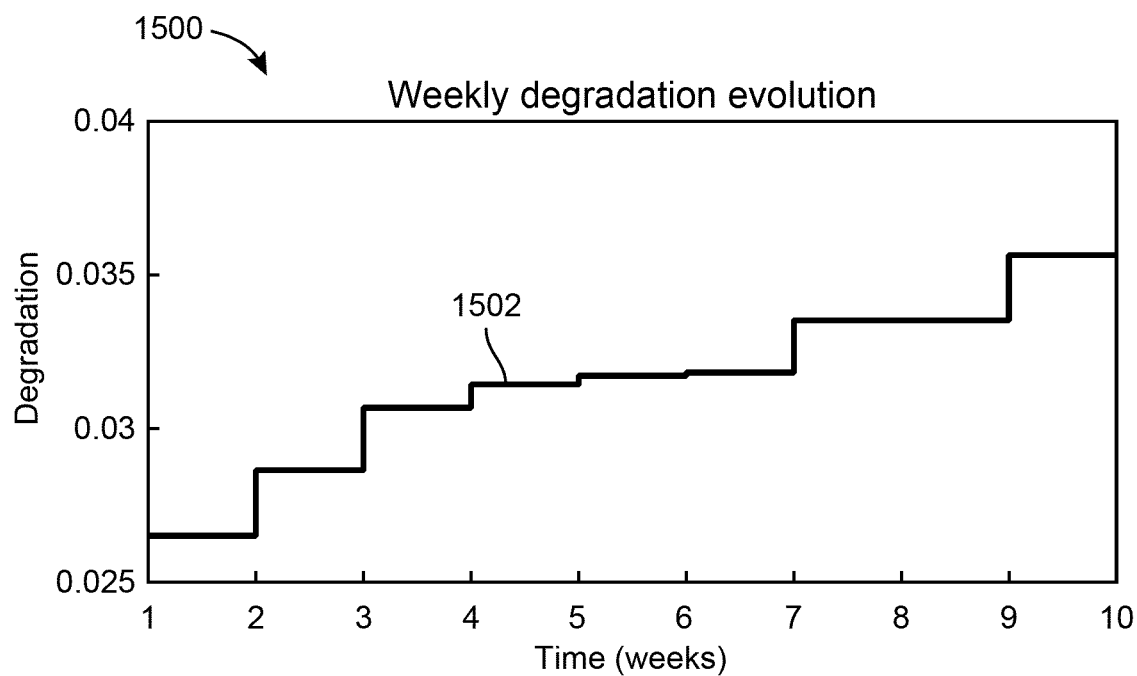
FIG. 15A is a graph illustrating evolution of degradation states over time based on weekly time steps, according to some embodiments.

Referring now to FIG. 15A, a graph 1500 illustrating evolution of degradation states over time based on weekly time steps is shown, according to some embodiments. Graph 1500 is shown to include a series 1502. Series 1502 can illustrate how degradation states of building equipment change on a weekly timescale (i.e., weekly time step). Series 1502 can be reflective of considerations made in a long-term optimization that considers how building equipment degrades each week. As should be apparent from series

1502, the long-term model of the long-term optimization may assume a constant degradation in each week and that degradation increases only occur at a beginning of each week. Said assumptions may result in a relatively coarse approximation of degradation that does not account for daily changes in degradation.

Figure 15B:
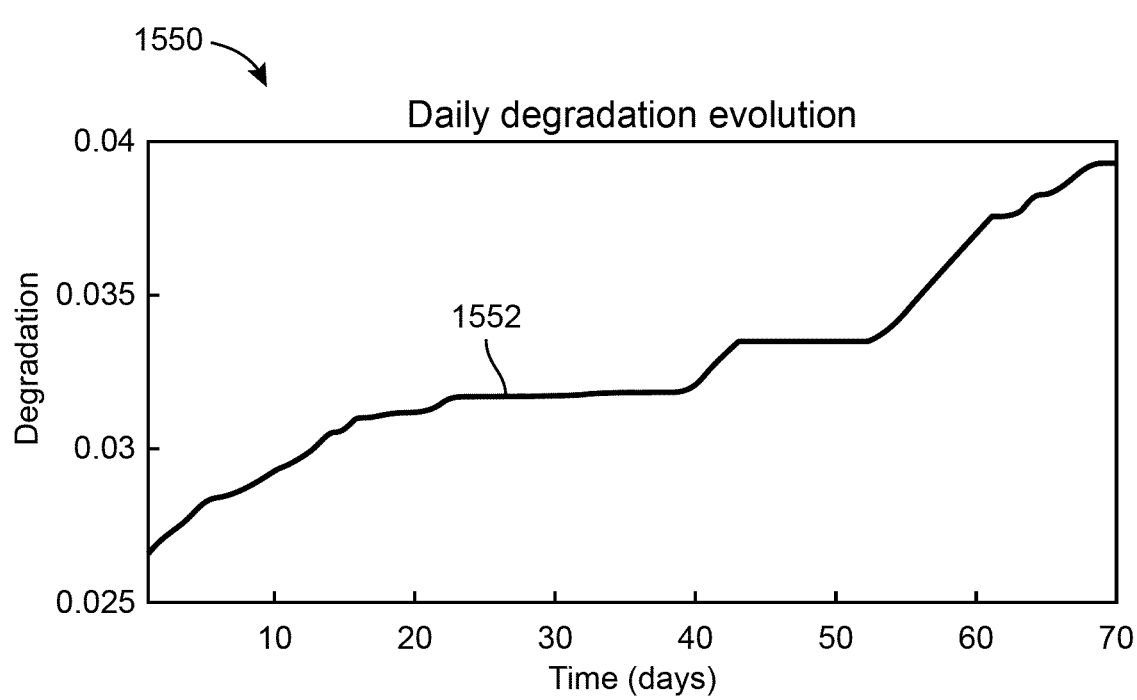
FIG. 15B is a graph illustrating evolution of degradation states over time based on daily time steps, according to some embodiments.

Referring now to FIG. 15B, a graph 1550 illustrating evolution of degradation states over time based on daily time steps is shown, according to some embodiments. Graph 1550 is shown to include a series 1552. Series 1552 can illustrate how degradation states of building equipment change on a daily timescale (i.e., daily time step). Series 1552 can be reflective of considerations made in a short-term optimization that accounts for how building equipment degrades each day. Considering degradation in a daily time step can reveal additional details of degradation evolution. Series 1552 can be compared to series 1502 of FIG. 15A to appreciate additional benefits of utilizing shorter time steps if performing optimizations. In particular, series 1552 can illustrate specific day-to-day changes of degradation states whereas series 1502 only illustrates weekly changes. Using more accurate degradation predictions can result in more accurate cost predictions.

Figure 16:
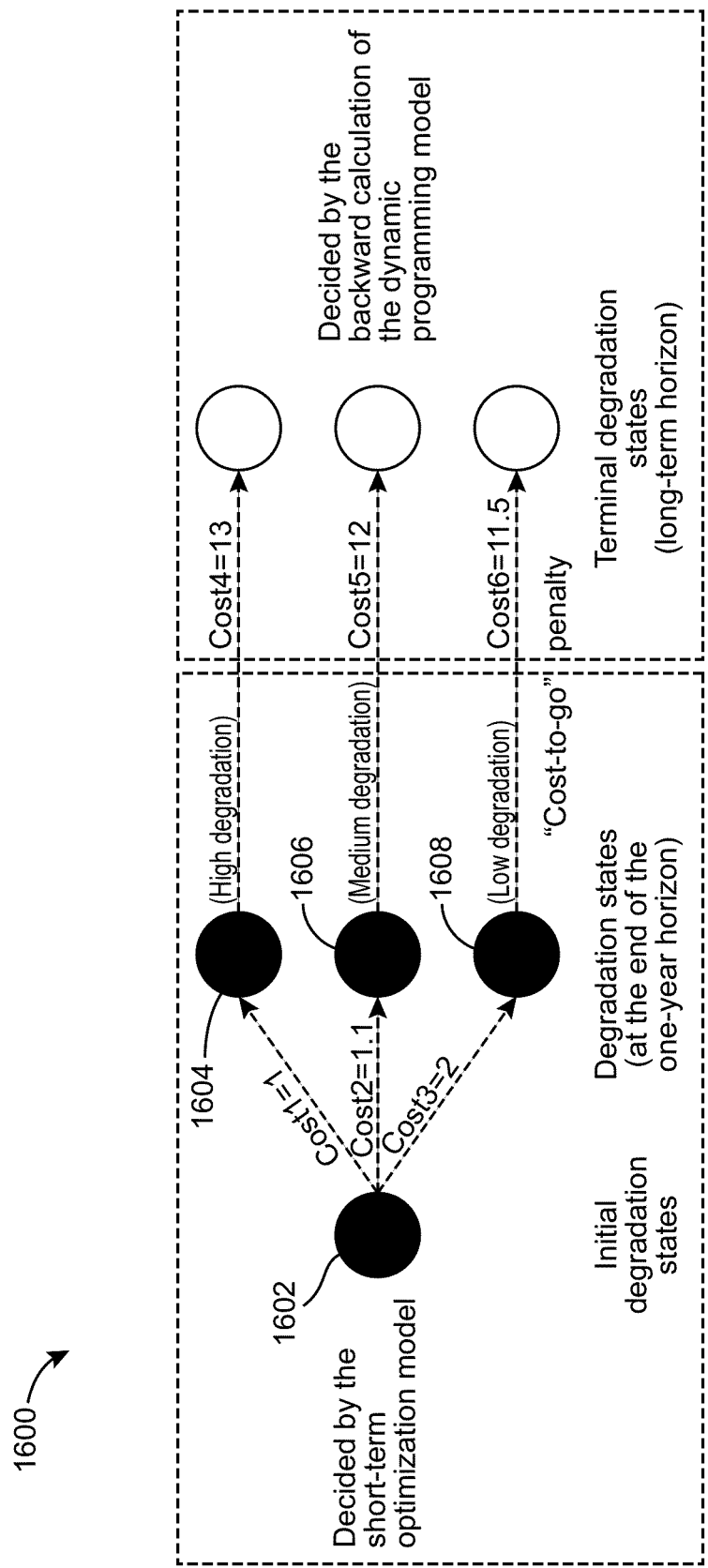
FIG. 16 is an example illustration of an impact of including a cost-to-go penalty in a short-term optimization, according to some embodiments.

Referring now to FIG. 16, an example illustration 1600 of an impact of including a cost-to-go penalty in a short-term optimization is shown, according to some embodiments. By incorporating the cost-to-go penalty in the short-term optimization, the short-term optimization can account for long-term costs as well. It should be appreciated that example illustration 1600 omits currency symbols for simplicity and that the values of the involved costs are given for illustrative purposes only. In example illustration 1600, for a given initial degradation state 1602, there may be three feasible schedules over the short-term horizon. A first feasible schedule 1604 is shown to cost 1 and does not include any maintenance or replacement. A second feasible schedule 1606 is shown to cost 1.1 because of maintenance being performed. Finally, a third feasible schedule 1608 is shown to cost 2 due to replacement being performed. First feasible schedule 1604, second feasible schedule 1606, and third feasible schedule 1608 can lead to high, medium and low degradation states, respectively.

If a future effect of a schedule selected is not considered, the optimization process may pick first feasible schedule 1604 as the optimal schedule for its lowest cost in the short-term. However, according to the cost-to-go penalty calculated by the dynamic programming model, a long-term cost associated with first feasible schedule 1604 is 13 due to the high degradation if this schedule is implemented, thus leading to a total cost of 14. On the contrary, if second feasible schedule 1606 is selected, the total cost is only 1.1+12=13.1. In this case, if the cost-to-go penalty is added, the short-term model will select second feasible schedule 1606, which is the schedule with a lowest total cost over the long-term horizon considered.

Referring now to FIG. 17, a graph 1700 illustrating a projection of a cost-to-go penalty onto a surface 1702 is shown, according to some embodiments. As described above, the cost-to-go penalty from the dynamic programming model (i.e., the long-term model) is included to account for a long-term effect of decisions made within the short-term horizon and this penalty is a high-dimensional function of the degradation states. In particular, graph 1700 can illustrate the projection of the cost-to-go penalty onto $D_{compressor}$ RT surface 1702. In this case, $D_{compressor}$ can represent the degradation of a compressor and RT can be included in the dynamic programming model to denote a week when replacement is executed. For example, if RT=15, then the system may be replaced in the 15$^{th}$ week of a current year. RT=0 can denote that no replacement so far in the current year at a given time point. It should be clear from graph 1700 that there is a significant difference in a shape of the cost-to-go penalty between the situations when the system has been replaced (RT #0) and when there is no system replacement (RT=0).

Referring generally to FIGS. 18A-24B, experimental results of performing example experiments of incorporating short-term scheduling with the MPM framework on various systems are shown, according to some embodiments. In the example experiments, a default short-term horizon was set to one year and a long-term horizon (24-year horizon) was considered via embedding the cost-to-go penalty into the short-term optimization. In particular, FIGS. 18A-18B can illustrate how inclusion of the cost-to-go penalty can avoid myopic solutions, FIGS. 19A-20B can illustrate result on a brand-new system, FIGS. 21A-22B can illustrate results on a system with high recoverable degradation and low permanent degradation, and FIGS. 23A-24B can illustrate results on a system with high permanent degradation. Solutions of the two subproblems were obtained within a 2% optimality gap within five minutes in total for all the case studies.

Figure 18A:
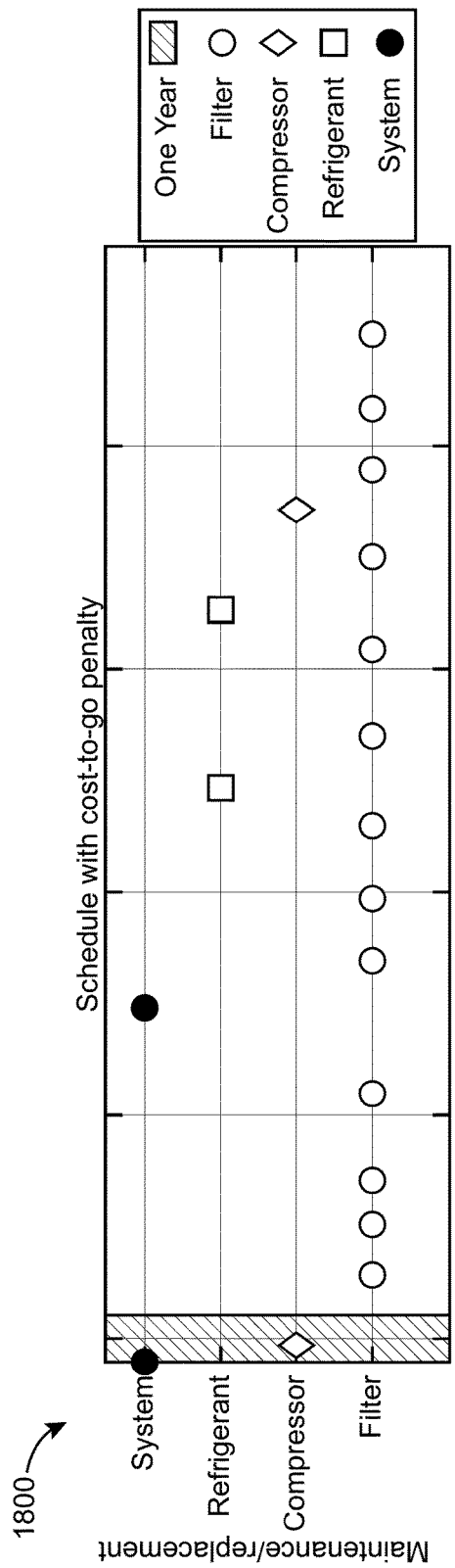
FIG. 18A is a graph illustrating a maintenance and replacement schedule generated with accounting for a cost-to-go penalty, according to some embodiments.
Figure 18B:
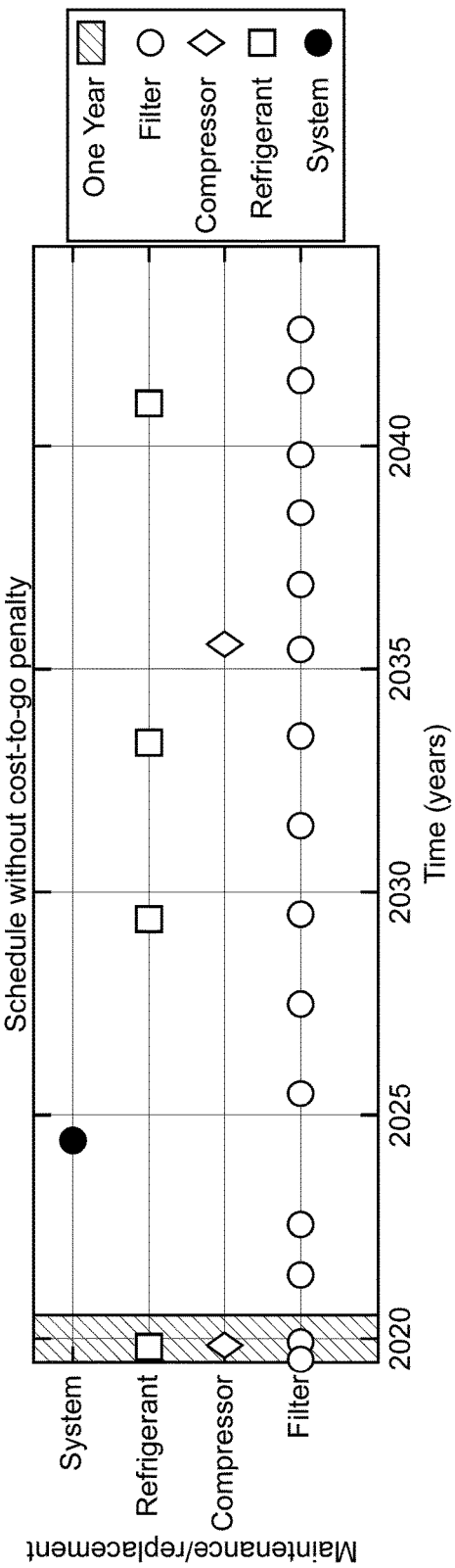
FIG. 18B is a graph illustrating a maintenance and replacement schedule generated without accounting for a cost-to-go penalty, according to some embodiments.

Referring now to FIGS. 18A-18B, a pair of graphs illustrating maintenance and replacement schedules generated with and without accounting for a cost-to-go penalty are shown, according to some embodiments. In particular, FIG. 18A is shown to include a graph 1800 that illustrates a maintenance and replacement schedule that was generated accounting for the cost-to-go penalty whereas FIG. 18B is shown to include a graph 1850 that illustrates a maintenance and replacement schedule that was generated without accounting for the cost-to-go penalty.

In this case, a 19-year old system was considered whose initial degradation states were $[\delta_{Filter}^{o}, \delta_{Compressor}^{o}, \delta_{Refrigerant}]$=[0.8,0.5,0.5]. Based on the degradation states, maintenance and replacement schedules were generated utilizing the short-term optimization model with/without the cost-to-go penalty in graphs 1800 and 1850, respectively. It should be appreciated that the schedules indicated by graphs 1800 and 1850 are very different and lead to distinct total costs over the long-term horizon. In particular, the schedule associated with graph 1850 results in a total cost of $1.505× 10$^5$, while the schedule associated with graph 1800 (i.e., the schedule account for the cost-to-go penalty) results in a total cost of only $1.430×10$^5$. For the schedule obtained with the cost-to-go penalty, system replacement is shown to be scheduled at the beginning of the long-term horizon, which recovers the system to a brand-new system, thereby leading to a sharp decrease in operational costs. However, the schedule obtained without the cost-to-go penalty is clearly myopic as only maintenances tasks are scheduled to avoid a high cost associated with system replacement. This myopic schedule results in higher degradation states for building equipment and therefore increased operational costs. As should be clear, incorporating the cost-to-go penalty into the short-term optimization can help avoid myopic schedules that allow degradation of building equipment to be left effectively uncontrolled.

Figures 19A, 19B:
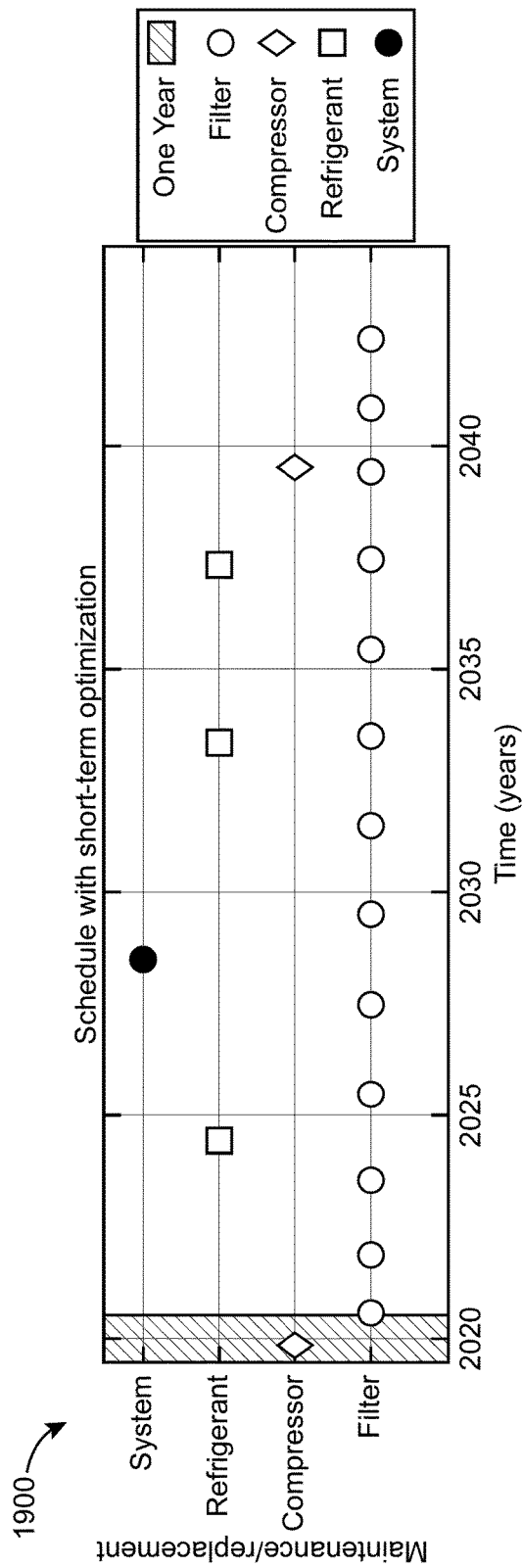
FIG. 19A is a graph illustrating a maintenance and replacement schedule generated with a short-term optimization being performed for a brand-new system, according to some embodiments.
FIG. 19B is a graph illustrating a maintenance and replacement schedule generated without a short-term optimization being performed for a brand-new system, according to some embodiments.

Referring now to FIGS. 19A and 19B, a pair of graphs illustrating maintenance and replacement schedules generated with and without a short-term optimization being performed for a brand-new system are shown, according to some embodiments. In particular, FIG. 19A is shown to include a graph 1900 that illustrates a maintenance and replacement schedule that is generated based on a short-term optimization whereas FIG. 19B is shown to include a graph 1950 that illustrates a maintenance and replacement schedule generated without performing a short-term optimization. As the system considered in generation of the schedules indicated by graphs 1900 and 1950 was new, the system therefore had initial degradation states of zero for all components (i.e., $[\delta_{Filter}^0, \delta_{compressor}^0, \delta_{Refrigerant}^0] = [0,0,0]$). In this example experiment, 25-year schedules with and without the short-term optimization model are obtained as shown by graphs 1900 and 1950 respectively. Corresponding degradation evolution profiles are shown in detail below with reference to FIGS. 20A and 20B. It should be clear that the schedules of graphs 1900 and 1950 (i.e., with and without the short-term optimization model) are very similar, thereby indicating that inclusion of the short-term optimization model does not undermine the quality of maintenance and replacement schedules.

Costs associated with the schedules shown in graphs 1900 and 1950 can be seen in the following table:

TABLE 1

Cost Comparison of a Brand-New System

|  | Short-term cost ($) | Later long-term cost ($) | Total cost with short-term opt ($) | Total cost without short-term opt ($) |
| --- | --- | --- | --- | --- |
| Total | 4323 | 131949 | 136272 | 135907 |
| Maintenance | 350 | 21440 | 21790 | 21440 |
| Operation | 3973 | 110509 | 114482 | 114467 |

The similar total cost from each of the two schedules further illustrates the fact that incorporation of the short-term optimization does not undermine the quality of maintenance and replacement schedules. The small differences in total cost may result from decreases of the cost-to-go penalty if maintenance is scheduled at the end of the short-term horizon for the short-term optimization model.

Moreover, a schedule with higher resolution within the short-term horizon is obtained as shown in Table 2 below:

TABLE 2

Comparison of Short-Term Horizon Schedules Obtained for the Brand-New System

|  | From Short-Term Optimization | From Dynamic Programming |
| --- | --- | --- |
| Filter | 9 Jul. 2020 | The week of 19 Jul. 2020 |
| Compressor | — | — |
| Refrigerant | — | — |
| System | — | — |

In particular, the short-term optimization model is shown to schedule maintenance of the filter on a specific day instead of a time window of a week.

Figure 20A:
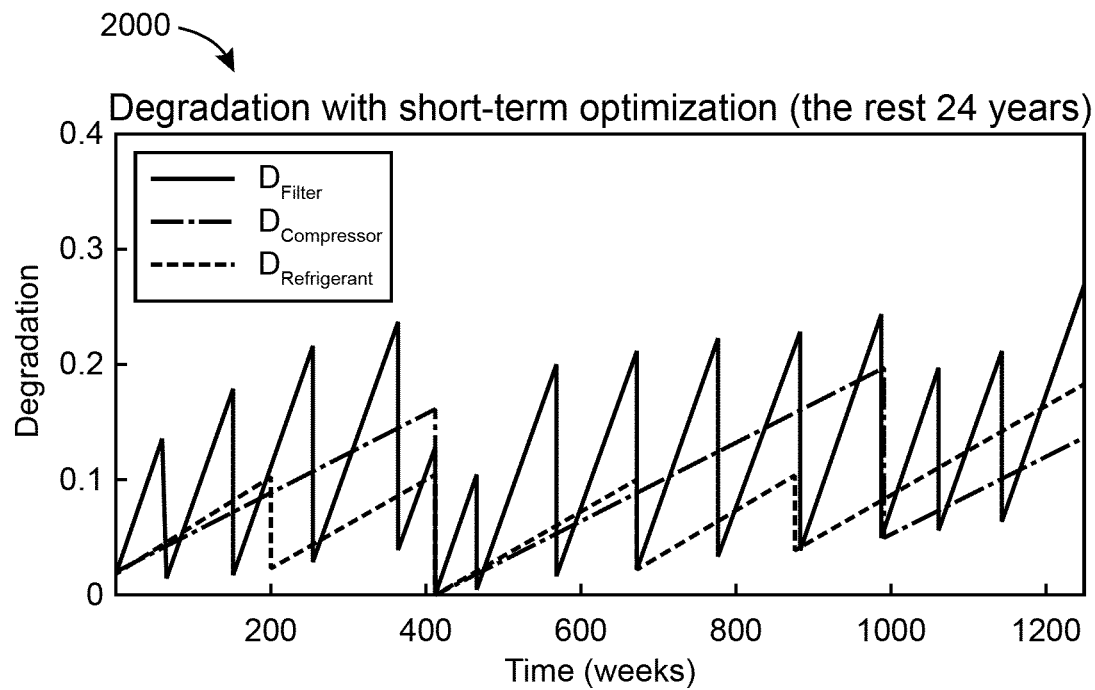
FIG. 20A is a graph illustrating a degradation evolution profile of building equipment as associated with the maintenance and replacement schedule of FIG. 23A, according to some embodiments.
Figure 20B:
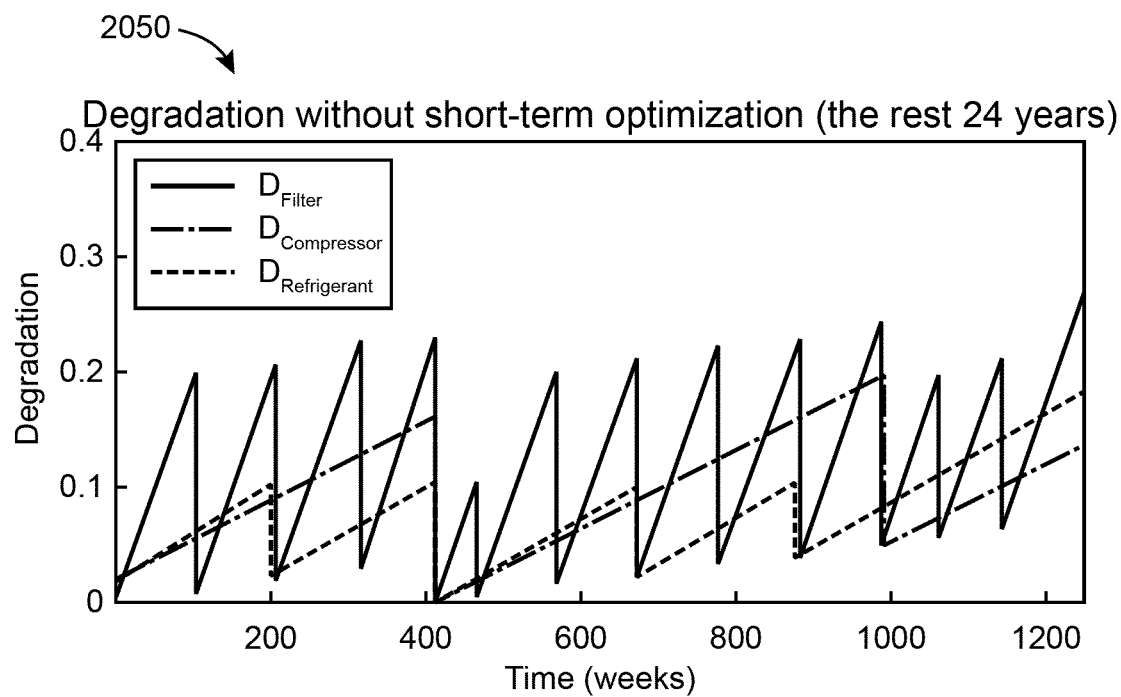
FIG. 20B is a graph illustrating a degradation evolution profile of building equipment as associated with the maintenance and replacement schedule of FIG. 23B, according to some embodiments.

Referring now to FIGS. 20A and 20B, a pair of graphs illustrating degradation evolution profiles of building equipment as associated with the maintenance and replacement schedules of FIGS. 19A and 19B respectively are shown, according to some embodiments. In particular, FIG. 20A is shown to include a graph 2000 illustrating degradation states associated with the schedule of graph 1900 as described with reference to FIG. 19A. FIG. 20B is shown to include a graph 2050 illustrating degradation states associated with the schedule of graph 1950 as described with reference to FIG. 19B. As can further be appreciated in graphs 2000 and 2050, incorporation of the short-term optimization does not significantly impact degradation states for the new system and therefore does not undermine quality of the schedules.

Referring now to FIGS. 21A and 21B, a pair of graphs illustrating maintenance and replacement schedules generated with and without a short-term optimization being performed for a system high recoverable degradation are shown, according to some embodiments. In particular, FIG. 21A is shown to include a graph 2100 that illustrates a maintenance and replacement schedule that is generated based on a short-term optimization whereas FIG. 21B is shown to include a graph 2150 that illustrates a maintenance and replacement schedule generated without performing a short-term optimization. In this example experiment, the system considered was a four year old system with initial degradation states of $[\delta_{Filter}^0, \delta_{Compressor}^0, \delta_{Refrigerant}^0] = [0.5, 0.2, 0.25]$. Degradation evolution profiles for graphs 2100 and 2150 are described in detail below with reference to FIGS. 22A and 22B. As should be appreciated from graphs 2100 and 2150, the schedules are relatively similar, thereby indicating that the short-term optimization may not impair quality of the schedules for systems with high recoverable degradation.

Total costs associated with the schedules indicated by graphs 2100 and 2150 can be seen in Table 3 below:

TABLE 3

Cost Comparison of a System with High Recoverable Degradation

|  | Short-term cost ($) | Later long-term cost ($) | Total cost with short-term opt ($) | Total cost without short-term opt ($) |
| --- | --- | --- | --- | --- |
| Total | 8781 | 134221 | 143002 | 142696 |
| Maintenance | 4550 | 21440 | 25990 | 25990 |
| Operation | 4231 | 112781 | 117012 | 116706 |

Likewise, short-term schedules can be shown in Table 4 below:

TABLE 4

Comparison of Short-Term Horizon Schedules Obtained for the System with High Recoverable Degradation

|  | From Short-Term Optimization | From Dynamic Programming |
| --- | --- | --- |
| Filter | 10 Jul. 2019 | The week of 14 Jul. 2019 |
| Compressor | 14 Jul. 2019 | The week of 14 Jul. 2019 |
| Refrigerant | 10 Jul. 2019 | The week of 14 Jul. 2019 |
| System | — | — |

As should be clear from Tables 3 and 4, the proposed short-term model results in valid results and can be appreciated as applicable to the MPM framework.

Figure 22A:
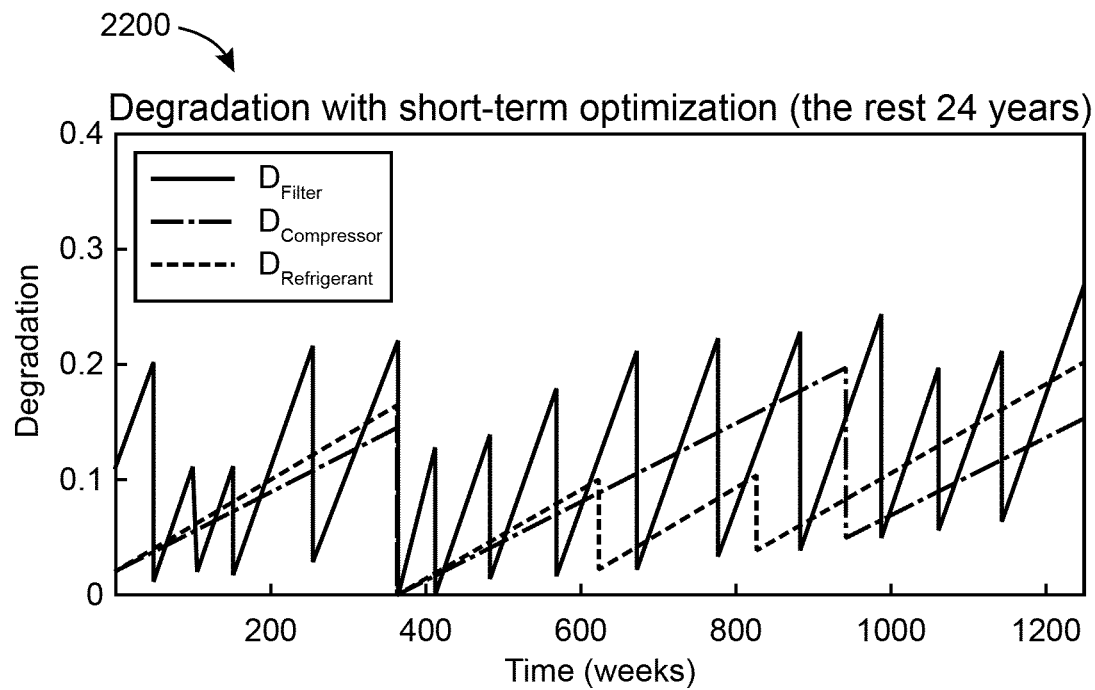
FIG. 22A is a graph illustrating a degradation evolution profile of building equipment as associated with the maintenance and replacement schedule of FIG. 21A, according to some embodiments.
Figure 22B:
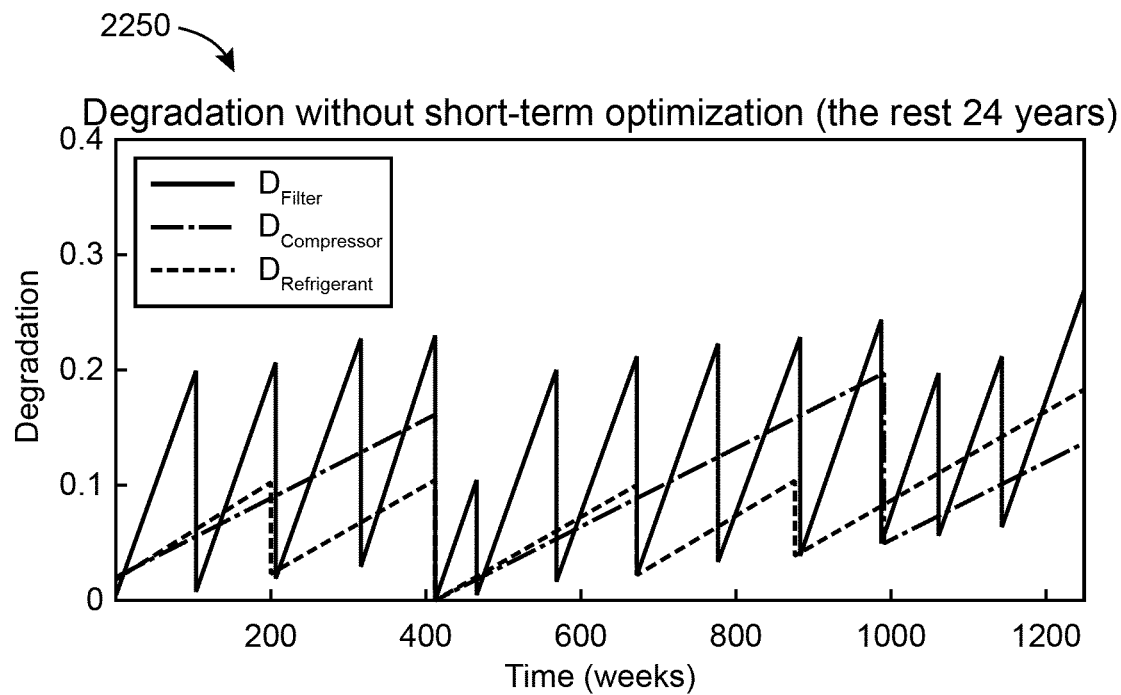
FIG. 22B is a graph illustrating a degradation evolution profile of building equipment as associated with the maintenance and replacement schedule of FIG. 21B, according to some embodiments.

Referring now to FIGS. 22A and 22B, a pair of graphs illustrating degradation evolution profiles of building equipment as associated with the maintenance and replacement schedules of FIGS. 21A and 21B respectively are shown, according to some embodiments. In particular, FIG. 22A is shown to include a graph 2200 illustrating degradation states associated with the schedule of graph 2100 as described with reference to FIG. 21A. FIG. 22B is shown to include a graph 2250 illustrating degradation states associated with the schedule of graph 2150 as described with reference to FIG. 21B. As can further be appreciated in graphs 2200 and 2250, incorporation of the short-term optimization does not significantly impact degradation states for the system with higher recoverable degradation and therefore may not undermine quality of the schedules.

Referring now to FIGS. 23A and 23B, a pair of graphs illustrating maintenance and replacement schedules generated with and without a short-term optimization being performed for a system high total degradation are shown, according to some embodiments. In particular, FIG. 23A is shown to include a graph 2300 that illustrates a maintenance and replacement schedule that is generated based on a short-term optimization whereas FIG. 23B is shown to include a graph 2350 that illustrates a maintenance and replacement schedule generated without performing a short-term optimization.

In this example experiment, the system considered was a 19-year old system. As shown in graphs 2300 and 2350, although the schedules within the short-term horizon are similar (system replacement is scheduled at the beginning of the short-term horizon in both schedules), the schedules in the long-term horizon show some discrepancies. As compared to the schedule associated with graph 2350 (i.e., the schedule without the short-term optimization model), the schedule associated with graph 2300 includes advanced system replacement, higher frequency of filter maintenance during the first several years, and fewer refrigerant maintenance tasks.

The schedule associated with graph 2300 includes a higher cost (almost $900) compared to the schedule associated with graph 2350 as seen in Table 5 below:

TABLE 5

Cost Comparison of a System with High Permanent Degradation

|  | Short-term cost ($) | Later long-term cost ($) | Total cost with short-term opt ($) | Total cost without short-term opt ($) |
| --- | --- | --- | --- | --- |
| Total | 15667 | 132860 | 148527 | 147688 |
| Maintenance | 11640 | 21090 | 32730 | 33080 |
| Operation | 4027 | 111770 | 115797 | 114608 |

However, the system replacement date within the short-term horizon is advanced only ten days as shown below in Table 6:

TABLE 6

Comparison of Short-Term Horizon Schedules Obtained for the System with High Total Degradation

|  | From Short-Term Optimization | From Dynamic Programming |
| --- | --- | --- |
| Filter | — | — |
| Compressor | — | — |
| Refrigerant | — | — |
| System | 11 Jul. 2019 | The week of 21 Jul. 2019 |

Examination of the short-term optimization model did not find anything suspected.

Figure 24A:
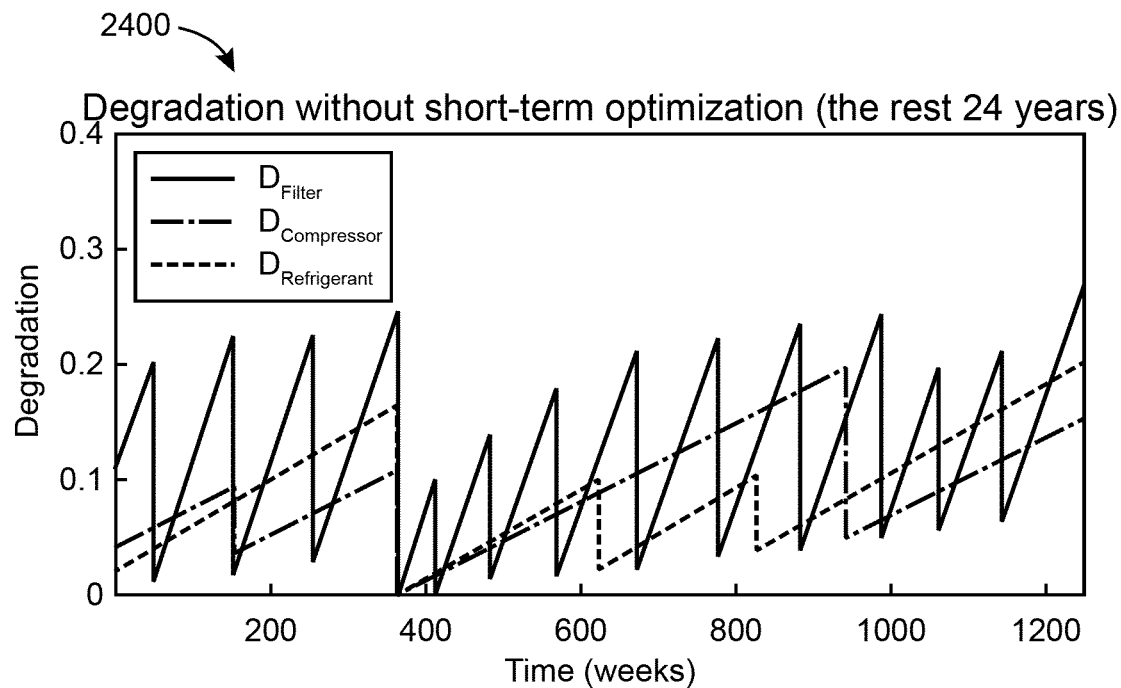
FIG. 24A is a graph illustrating a degradation evolution profile of building equipment as associated with the maintenance and replacement schedule of FIG. 23A, according to some embodiments.
Figure 24B:
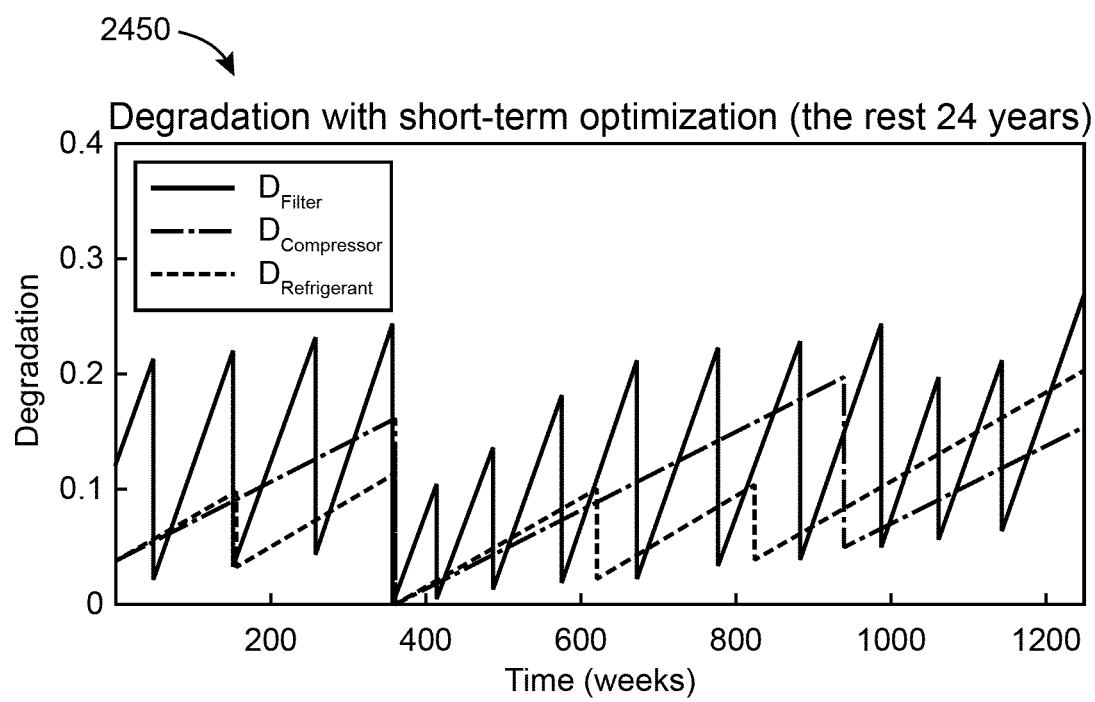
FIG. 24B is a graph illustrating a degradation evolution profile of building equipment as associated with the maintenance and replacement schedule of FIG. 23B, according to some embodiments.

Referring now to FIGS. 24A and 24B, a pair of graphs illustrating degradation evolution profiles of building equipment as associated with the maintenance and replacement schedules of FIGS. 23A and 23B respectively are shown, according to some embodiments. In particular, FIG. 24A is shown to include a graph 2400 illustrating degradation states associated with the schedule of graph 2300 as described with reference to FIG. 23A. FIG. 24B is shown to include a graph 2450 illustrating degradation states associated with the schedule of graph 2350 as described with reference to FIG. 23B. As can further be appreciated in graphs 2400 and 2450, incorporation of the short-term optimization does not significantly impact degradation states for the system with higher total degradation and therefore may not undermine quality of the schedules.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for performing model predictive maintenance (MPM) of building equipment, the controller comprising:
one or more processors; and
one or more non-transitory computer-readable media storing instructions that, when executed by the one or more processors, cause the one or more processors to perform operations comprising:
performing a first model predictive maintenance process to generate a short-term maintenance and replacement schedule comprising a first set of maintenance decisions or replacement decisions for the building equipment at a first resolution over a duration of a short-term horizon;
performing a second model predictive maintenance process to generate a long-term maintenance and replacement schedule comprising a second set of maintenance decisions or replacement decisions for the building equipment at a second resolution over a duration of a long-term horizon, the second resolution lower than the first resolution;
combining the short-term maintenance and replacement schedule and the long-term maintenance and replacement schedule to generate a combined maintenance and replacement schedule comprising the first set of maintenance decisions or replacement decisions at the first resolution over the duration of the short-term horizon and the second set of maintenance decisions or replacement decisions at the second resolution over the duration of the long-term horizon; and
operating the building equipment according to operating decisions of at least one of the short-term maintenance and replacement schedule or the long-term maintenance and replacement schedule.

2. The controller of claim 1, the operations further comprising performing a backward calculation of a long-term model to generate a cost penalty defining a total cost over the long-term horizon, wherein the first model predictive maintenance process is performed based on the cost penalty.

3. The controller of claim 1, the operations further comprising identifying a degradation state at an end of the short-term horizon based on the first model predictive maintenance process, wherein the second model predictive maintenance process is performed based on the degradation state at the end of the short-term horizon.

4. The controller of claim 1, the operations further comprising concatenating the short-term maintenance and replacement schedule and the long-term maintenance and replacement schedule to generate a final maintenance and replacement schedule that optimizes costs over the short-term horizon and the long-term horizon.

5. The controller of claim 1, the operations further comprising:
decomposing a first objective function of the first model predictive maintenance process into a replacement objective function that enforces replacement of the building equipment and a non-replacement objective function that forbids replacement of the building equipment;
performing separate optimizations for the replacement objective function and the non-replacement objective function to generate separate maintenance and replacement schedules; and
selecting whichever of the separate maintenance and replacement schedules that is associated with a lower total cost as the short-term maintenance schedule.

6. The controller of claim 1, wherein the first model predictive maintenance process and the second model predictive maintenance process are based on at least one of:
system information describing one or more dynamics of a space of a building;
pricing information;
a resource demand;
weather information;
maintenance costs; or
power models of the building equipment.

7. The controller of claim 1, wherein the first model predictive maintenance process and the second model predictive maintenance process are performed respective of a total degradation of the building equipment, wherein the total degradation comprises:
a recoverable degradation that can be recovered by performing maintenance on the building equipment or by replacing the building equipment; and
a permanent degradation that can be recovered by replacing the building equipment and cannot be recovered by performing maintenance on the building equipment.

8. A method for performing model predictive maintenance (MPM) of building equipment, the method comprising:
performing a first model predictive maintenance process to generate a short-term maintenance and replacement schedule for the building equipment over a duration of a short-term horizon having an end at a future time and a predicted degradation state of the building equipment at the end of the short-term horizon, the predicted degradation state predicted to result from the short-term maintenance and replacement schedule;
using the predicted degradation state of the building equipment at the end of the short-term horizon to establish an initial degradation state of the building equipment at a beginning of a long-term horizon following the short-term horizon;
performing a second model predictive maintenance process based on the initial degradation state of the building equipment at the beginning of the long-term horizon to generate a long-term maintenance and replacement schedule for the building equipment over a duration of the long-term horizon, wherein the second model predictive maintenance process seeks to minimize a control objective over the long-term horizon and maintains the initial degradation state of the building equipment at a fixed value when performing the second model predictive maintenance process; and
operating the building equipment according to operating decisions of at least one of the short-term maintenance and replacement schedule or the long-term maintenance and replacement schedule.

9. The method of claim 8, further comprising performing a backward calculation of a long-term model to generate a cost penalty defining a total cost over the long-term horizon, wherein the first model predictive maintenance process is performed based on the cost penalty.

10. The method of claim 8, further comprising concatenating the short-term maintenance and replacement schedule and the long-term maintenance and replacement schedule to generate a final maintenance and replacement schedule that optimizes costs over the short-term horizon and the long-term horizon.

11. The method of claim 8, further comprising:
decomposing a first objective function of the first model predictive maintenance process into a replacement objective function that enforces replacement of the building equipment and a non-replacement objective function that forbids replacement of the building equipment;
performing separate optimizations for the replacement objective function and the non-replacement objective function to generate separate maintenance and replacement schedules; and
selecting whichever of the separate maintenance and replacement schedules that is associated with a lower total cost as the short-term maintenance schedule.

12. The method of claim 8, wherein the first model predictive maintenance process and the second model predictive maintenance process are based on at least one of:
system information describing one or more dynamics of a space of a building;
pricing information;
a resource demand;
weather information;
maintenance costs; or
power models of the building equipment.

13. The method of claim 8, wherein the first model predictive maintenance process and the second model predictive maintenance process are performed respective of a total degradation of the building equipment, wherein the total degradation comprises:
a recoverable degradation that can be recovered by performing maintenance on the building equipment or by replacing the building equipment; and
a permanent degradation that can be recovered by replacing the building equipment and cannot be recovered by performing maintenance on the building equipment.

14. A model predictive maintenance (MPM) system for building equipment, the system comprising:
the building equipment that operates to affect a variable state or condition of a building; and
one or more processing circuits comprising one or more processors and memory storing instructions that, when executed by the one or more processors, cause the one or more processors to perform operations comprising:
performing a first optimization of a first objective function to generate a short-term maintenance and replacement schedule for the building equipment over a duration of a short-term horizon, the first objective function comprising a penalty based on a predicted degradation state of the building equipment at an end of the short-term horizon, the predicted degradation state predicted to result from the short-term maintenance and replacement schedule, the penalty separate from a cost of performing maintenance on the building equipment or replacing the building equipment over the duration of the short-term horizon;
performing a second optimization of a second objective function to generate a long-term maintenance and replacement schedule for the building equipment over a duration of a long-term horizon; and
operating the building equipment according to operating decisions of at least one of the short-term maintenance and replacement schedule or the long-term maintenance and replacement schedule.

15. The system of claim 14, the operations further comprising performing a backward calculation of a long-term model to generate a cost penalty defining a total cost over the long-term horizon, wherein the first optimization is performed based on the cost penalty.

16. The system of claim 14, the operations further comprising identifying a degradation state at an end of the short-term horizon based on the optimization, wherein the second optimization is performed based on the degradation state at the end of the short-term horizon.

17. The system of claim 14, the operations further comprising concatenating the short-term maintenance and replacement schedule and the long-term maintenance and replacement schedule to generate a final maintenance and replacement schedule that optimizes costs over the short-term horizon and the long-term horizon.

18. The system of claim 14, the operations further comprising:
decomposing the first objective function into a replacement objective function that enforces replacement of the building equipment and a non-replacement objective function that forbids replacement of the building equipment;
performing separate optimizations for the replacement objective function and the non-replacement objective function to generate separate maintenance and replacement schedules; and
selecting whichever of the separate maintenance and replacement schedules that is associated with a lower total cost as the short-term maintenance schedule.

19. The system of claim 14, wherein the first optimization and the second optimization are performed respective of a total degradation of the building equipment, wherein the total degradation comprises:
a recoverable degradation that can be recovered by performing maintenance on the building equipment or by replacing the building equipment; and
a permanent degradation that can be recovered by replacing the building equipment and cannot be recovered by performing maintenance on the building equipment.

* * * * *